(12) United States Patent
Merg et al.

(10) Patent No.: US 12,293,616 B2
(45) Date of Patent: *May 6, 2025

(54) SUPPLEMENTING VEHICLE SERVICE CONTENT WITH SCAN TOOL INITIALIZATION LINKS

(71) Applicant: Snap-on Incorporated, Kenosha, WI (US)

(72) Inventors: Patrick S. Merg, Hollister, CA (US); Roy S. Brozovich, Campbell, CA (US); Jacob G. Foreman, San Jose, CA (US); Brett A. Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,740

(22) Filed: May 19, 2022

(65) Prior Publication Data

US 2022/0277599 A1 Sep. 1, 2022

Related U.S. Application Data

(63) Continuation of application No. 16/216,354, filed on Dec. 11, 2018, now Pat. No. 11,354,944.

(51) Int. Cl.
*G07C 5/08* (2006.01)
*B60R 16/023* (2006.01)
*G07C 5/00* (2006.01)

(52) U.S. Cl.
CPC ........ *G07C 5/0808* (2013.01); *B60R 16/0234* (2013.01); *G07C 5/008* (2013.01); *G07C 2205/02* (2013.01)

(58) Field of Classification Search
CPC .. G07C 5/0808; G07C 5/008; G07C 2205/02; B60R 16/0234

See application file for complete search history.

(56) References Cited

U.S. PATENT DOCUMENTS 6,181,992 B1 1/2001 Gurne et al.
6,556,904 B1 * 4/2003 Larson ............... G07C 5/008
701/34.3

(Continued)

FOREIGN PATENT DOCUMENTS

CA 2692530 8/2010
CA 3059924 8/2018

(Continued)

*Primary Examiner* — Dale W Hilgendorf
(74) *Attorney, Agent, or Firm* — McDonnell Boehnen Hulbert & Berghoff LLP

(57) ABSTRACT

In an embodiment, a method includes receiving, by a computing device, textual vehicle service content. The method further includes identifying, by the computing device, a vehicle scan tool function relevant to associated text at a location within the textual vehicle service content. The method additionally includes modifying, by the computing device, the textual vehicle service content to include a selectable link at the location of the associated text, wherein the selectable link is selectable to initialize a vehicle scan tool to perform the identified vehicle scan tool function on a vehicle. The method also includes providing, by the computing device, the modified textual vehicle service content including the selectable link.

19 Claims, 28 Drawing Sheets

(56) References Cited

U.S. PATENT DOCUMENTS

| | | | |
|---|---|---|---|
| 8,140,358 | B1 | 3/2012 | Ling et al. |
| 8,543,562 | B2* | 9/2013 | Mule ................... G06F 11/0793 |
| | | | 707/706 |
| 9,201,930 | B1* | 12/2015 | Merg ................... G06F 16/2465 |
| 9,672,665 | B1* | 6/2017 | Kraft ................... G06Q 30/0207 |
| 10,109,115 | B2 | 10/2018 | Rajpathak et al. |
| 10,489,990 | B2 | 11/2019 | Hokenmaier et al. |
| 10,553,119 | B1* | 2/2020 | Shah ....................... G06Q 50/40 |
| 10,759,328 | B2 | 9/2020 | Zizzadoro |
| 11,354,944 | B2* | 6/2022 | Merg ................... G07C 5/0808 |
| 11,450,154 | B2 | 9/2022 | Merg et al. |
| 11,580,792 | B1 | 2/2023 | Kraft et al. |
| 11,681,989 | B2 | 6/2023 | Merg et al. |
| 2003/0004623 | A1 | 1/2003 | Namaky et al. |
| 2004/0172177 | A1 | 9/2004 | Nagai et al. |
| 2005/0171661 | A1* | 8/2005 | Abdel-Malek ......... G06Q 10/06 |
| | | | 701/19 |
| 2006/0052921 | A1 | 3/2006 | Bodin et al. |
| 2006/0101074 | A1* | 5/2006 | Cancilla ................ G07C 5/0808 |
| 2007/0032207 | A1* | 2/2007 | Shah ................... B60R 16/0207 |
| | | | 455/111 |
| 2007/0088465 | A1 | 4/2007 | Heffington |
| 2008/0270075 | A1* | 10/2008 | Bertosa ................. G07C 5/008 |
| | | | 702/183 |
| 2009/0300548 | A1 | 12/2009 | Sullivan et al. |
| 2010/0138696 | A1 | 6/2010 | Dehaan et al. |
| 2012/0066451 | A1 | 3/2012 | Fujihara |
| 2012/0191476 | A1 | 7/2012 | Reid et al. |
| 2013/0204485 | A1 | 8/2013 | Chen et al. |
| 2013/0304306 | A1* | 11/2013 | Selkirk ................ G07C 5/0808 |
| | | | 701/31.4 |
| 2013/0317694 | A1* | 11/2013 | Merg ..................... G07C 5/008 |
| | | | 701/31.6 |
| 2014/0062865 | A1 | 3/2014 | Fateh |
| 2014/0222618 | A1 | 8/2014 | Stamp et al. |
| 2014/0277922 | A1 | 9/2014 | Chinnadurai et al. |
| 2014/0279707 | A1 | 9/2014 | Joshua et al. |
| 2014/0282256 | A1 | 9/2014 | Fish et al. |
| 2014/0316622 | A1 | 10/2014 | Martin et al. |
| 2015/0039176 | A1* | 2/2015 | Fish ....................... G07C 5/008 |
| | | | 701/31.6 |
| 2015/0067018 | A1* | 3/2015 | Connolly ............. G06Q 30/016 |
| | | | 709/202 |
| 2015/0121275 | A1* | 4/2015 | Marshall ............... G07C 5/008 |
| | | | 715/771 |
| 2015/0170439 | A1 | 6/2015 | Chen et al. |
| 2015/0324363 | A1 | 11/2015 | Merg |
| 2016/0072693 | A1* | 3/2016 | Michaelis ............... H04L 43/50 |
| | | | 709/203 |
| 2016/0314627 | A1 | 10/2016 | Fish et al. |
| 2016/0335816 | A1 | 11/2016 | Thoppae et al. |
| 2017/0083854 | A1 | 3/2017 | Elyea et al. |
| 2017/0132854 | A1 | 5/2017 | Merg et al. |
| 2017/0200336 | A1 | 7/2017 | Schmidt |
| 2018/0037211 | A1 | 2/2018 | Ramirez Leano et al. |
| 2018/0308295 | A1* | 10/2018 | Kwak ..................... G06F 9/453 |
| 2019/0130668 | A1* | 5/2019 | Johnson ................ G06F 40/143 |
| 2019/0266808 | A1 | 8/2019 | Merg et al. |
| 2019/0272362 | A1 | 9/2019 | Thorley et al. |
| 2020/0184743 | A1 | 6/2020 | Merg et al. |
| 2020/0184744 | A1 | 6/2020 | Merg et al. |
| 2020/0184745 | A1 | 6/2020 | Merg et al. |
| 2021/0117177 | A1 | 4/2021 | Noda |

FOREIGN PATENT DOCUMENTS

| | | |
|---|---|---|
| CN | 107067505 | 8/2017 |
| CN | 108268024 | 7/2018 |
| EP | 1560141 | 8/2005 |
| JP | 2007099145 | 4/2007 |
| JP | 2017165226 | 9/2017 |
| JP | 6310332 | 4/2018 |
| RU | 2013103505 | 8/2014 |
| WO | 2015/112813 | 7/2015 |
| WO | 2018/031721 | 2/2018 |

* cited by examiner

SYMPTOM 1 (P0171, P0101): PID19
SYMPTOM 2 (P0171, P0174): PID6
SYMPTOM 3 (FOULED SPARK PLUG): PID17
SYMPTOM 4 (P0174): PID12, PID19

↖ 71

SYMPTOM 1 (P0171, P0101): CT1, CT4
SYMPTOM 2 (P0171, P0174): CT1, CT4
SYMPTOM 3 (FOULED SPARK PLUG): NULL
SYMPTOM 4 (P0174): CT1, CT4

↖ 73

SYMPTOM 1 (P0171, P0101): FT5, FT6, FT7, FT8
SYMPTOM 2 (P0171, P0174): FT5, FT6, FT7, FT8
SYMPTOM 3 (FOULED SPARK PLUG): FT5, FT6, FT7, FT8
SYMPTOM 4 (P0174): FT5, FT6, FT7, FT8

↖ 75

SYMPTOM 1 (P0171, P0101): RP5
SYMPTOM 2 (P0171, P0174): RP5
SYMPTOM 3 (FOULED SPARK PLUG): NULL
SYMPTOM 4 (P0174): RP5
SYMPTOM 5 (THEFT DETERRENT – NO START): RP2, RP3

COMPONENT 1 (EGR VALVE): PID13, PID14, PID24
COMPONENT 2 (FUEL TANK): PID6, PID15, PID17
COMPONENT 3 (THERMOSTAT): PID3, PID27
COMPONENT 4 (VEHICLE SPEED SENSOR): PID9 ⬉
72

COMPONENT 1 (EGR VALVE): CT1, CT4
COMPONENT 2 (FUEL TANK): CT1, CT4, CT5
COMPONENT 3 (THERMOSTAT): CT5, CT8, CT11
COMPONENT 4 (VEHICLE SPEED SENSOR): CT1, CT4
COMPONENT 5 (CATALYTIC CONVERTER): CT10 ⬉
74

COMPONENT 1 (EGR VALVE): FT13, FT14
COMPONENT 2 (FUEL TANK): NULL
COMPONENT 3 (THERMOSTAT): FT3, FT4
COMPONENT 4 (VEHICLE SPEED SENSOR): NULL
COMPONENT 5 (CATALYTIC CONVERTER): NULL
COMPONENT 6 (FUEL PUMP): FT1 ⬉
76

COMPONENT 1 (EGR VALVE): NULL
COMPONENT 2 (FUEL TANK): NULL
COMPONENT 3 (THERMOSTAT): NULL
COMPONENT 4 (VEHICLE SPEED SENSOR): NULL
COMPONENT 5 (CATALYTIC CONVERTER): NULL
COMPONENT 6 (FUEL PUMP): NULL
COMPONENT 7 (THEFT DETERRENT): RP2, RP3
COMPONENT 8 (ENGINE CONTROL ECU): RP5, RP10 ⬉
78

PID1: 1 – FUEL SYSTEM STATUS
PID2: 2 – CALCULATED ENGINE LOAD
PID3: 3 – ENGINE COOLANT TEMPERATURE
PID4: 4 – SHORT TERM FUEL TRIM – BANK 1
PID5: 5 – LONG TERM FUEL TRIM – BANK 1
PID6: 6 – FUEL PRESSURE
PID7: 7 – INTAKE MANIFOLD ABSOLUTE PRESSURE
PID8: 8 – ENGINE RPM
PID9: 9 – VEHICLE SPEED
PID10: 10 – TIMING ADVANCE
PID11: 11 – INTAKE AIR TEMPERATURE
PID12: 12 – MAF AIR FLOW RATE
PID13: 13 – COMMANDED EGR
PID14: 14 – EGR ERROR
PID15: 15 – FUEL TANK LEVEL INPUT
PID16: 16 – RELATIVE THROTTLE POSITION
PID17: 17 – FUEL TYPE
PID18: 18 – EVAPORATOR SYSTEM VAPOR PRESSURE
PID19: 19 – MASS AIR FLOW SENSOR
PID20: 20 – INTAKE AIR TEMPERATURE SENSOR
PID21: 21 – FUEL INJECTION TIMING
PID22: 22 – ENGINE OIL TEMPERATURE
PID23: 23 – BOOST PRESSURE CONTROL
PID24: 24 – EXHAUST GAS RECIRCULATION TEMPERATURE
PID25: 25 – TURBOCHARGER RPM
PID26: 26 – WASTEGATE CONTROL
PID27: 27 – ENGINE RUN TIME
PID28: 28 - FUEL PRESSURE CONTROL SYSTEM
PID29: 29 – ENGINE PERCENT TORQUE DATA
PID30: 30 – INJECTION PRESSURE CONTROL SYSTEM
PID31: 31 – RESERVED
PID32: 32 – RESERVED

COMPONENT TEST 1: 40 – FREQUENCY TEST
COMPONENT TEST 2: 41 – SIGNATURE TEST
COMPONENT TEST 3: 42 – OUT OF RANGE NO SIGNAL TEST
COMPONENT TEST 4: 43 – VOLTAGE TEST
COMPONENT TEST 5: 44 – CURRENT TEST
COMPONENT TEST 6: 45 – RESISTANCE TEST
COMPONENT TEST 7: 46 – CAPACITANCE TEST
COMPONENT TEST 8: 47 – TEMPERATURE TEST
COMPONENT TEST 9: 48 – PRESSURE TEST
COMPONENT TEST 10: 49 – TAIL PIPE EMISSION TEST
COMPONENT TEST 11: 50 – CONTINUITY TEST
COMPONENT TEST 12: 51 – RESERVED
COMPONENT TEST 13: 52 – RESERVED
COMPONENT TEST 14: 53 – RESERVED
COMPONENT TEST 15: 54 – RESERVED
COMPONENT TEST 16: 55 – RESERVED

FUNCTIONAL TEST 1: 60 – FUEL PUMP ENGAGEMENT
FUNCTIONAL TEST 2: 61 – CLOSE EVAPORATOR CANISTER VENT VALVE
FUNCTIONAL TEST 3: 62 – ENGINE COOLING FAN HIGH
FUNCTIONAL TEST 4: 63 – ENGINE COOLING FAN LOW
FUNCTIONAL TEST 5: 64 – FUEL INJECTOR #1 ON
FUNCTIONAL TEST 6: 65 – FUEL INJECTOR #2 ON
FUNCTIONAL TEST 7: 66 – FUEL INJECTOR #3 ON
FUNCTIONAL TEST 8: 67 – FUEL INJECTOR #4 ON
FUNCTIONAL TEST 9: 68 – FUEL INJECTOR #5 ON
FUNCTIONAL TEST 10: 69 – FUEL INJECTOR #6 ON
FUNCTIONAL TEST 11: 70 – FUEL INJECTOR #7 ON
FUNCTIONAL TEST 12: 71 – FUEL INJECTOR #8 ON
FUNCTIONAL TEST 13: 72 – EGR VALVE OPEN
FUNCTIONAL TEST 14: 73 – EGR VALVE CLOSED
FUNCTIONAL TEST 15: 74 – RESERVED
FUNCTIONAL TEST 16: 75 – RESERVED

RESET PROCEDURE 1: 80 – OIL CHANGE INTERVAL RESET
RESET PROCEDURE 2: 81 – VEHICLE THEFT DETERRENT RESET
RESET PROCEDURE 3: 82 – IGNITION KEY IDENTIFIER RESET
RESET PROCEDURE 4: 83 – VIN LEARN RESET
RESET PROCEDURE 5: 84 – CALIBRATE ENGINE CONTROL ECU
RESET PROCEDURE 6: 85 – CALIBRATE ANTI-LOCK BRAKE ECU
RESET PROCEDURE 7: 86 – CALIBRATE TRACTION CONTROL ECU
RESET PROCEDURE 8: 87 – CALIBRATE AIRBAG SYSTEM ECU
RESET PROCEDURE 9: 88 – CALIBRATE POWERTRAIN CONTROL ECU
RESET PROCEDURE 10: 89 – CLEAR ENGINE CONTROL ECU DTC
RESET PROCEDURE 11: 90 – CLEAR ANTI-LOCK BRAKE ECU DTC
RESET PROCEDURE 12: 91 - CLEAR TRACTION CONTROL ECU DTC
RESET PROCEDURE 13: 92 - CLEAR AIRBAG SYSTEM ECU DTC
RESET PROCEDURE 14: 93 - CLEAR POWERTRAIN CONTROL ECU DTC
RESET PROCEDURE 15: 94 – RESERVED
RESET PROCEDURE 16: 95 – RESERVED

ENGINE (GASOLINE)
- ELECTRICAL SYSTEM
  - IGNITION SUB-SYSTEM
    - ☐ COIL
    - ☐ SPARK PLUG
  - CHARGING SUB-SYSTEM
    - ☐ ALTERNATOR
    - ☐ BATTERY
    - ☐ VOLTAGE REGULATOR
- EXHAUST SYSTEM
  - ☐ CATALYTIC CONVERTER
  - ☐ EGR VALVE
  - ☐ OXYGEN SENSOR
  - ☐ TURBOCHARGER BOOST PRESSURE SENSOR
- FUEL SYSTEM
  - ☐ FUEL FILTER
  - ☐ FUEL PUMP
  - ☐ FUEL RAIL
  - ☐ FUEL TANK LEVEL SENDING UNIT
- INTAKE SYSTEM
  - ☐ MASS AIRFLOW SENSOR
  - ☐ PCV HOSE
  - ☐ PCV VALVE

```
┌─────────────────────────────────────────────────────────────┐
│ Receiving, from a computing device, (i) a user identifier,  │
│ (ii) a vehicle identifier for a vehicle, and (iii)          │
│ contextual information related to vehicle service content   │
│ currently displayed on the computing device                 │
└─────────────────────────────────────────────────────────────┘
                            │
                            ▼                         ╲── 151
┌─────────────────────────────────────────────────────────────┐
│ Based on the contextual information, determining a vehicle  │
│ scan tool function to perform on the vehicle                │
└─────────────────────────────────────────────────────────────┘
                            │
                            ▼                         ╲── 152
┌─────────────────────────────────────────────────────────────┐
│ Identifying a vehicle scan tool associated with the user    │
│ identifier, wherein the vehicle scan tool is configured to  │
│ display at least one navigable menu to select from a        │
│ plurality of vehicle scan tool functions that includes the  │
│ vehicle scan tool function and to select from a plurality   │
│ of vehicle identifiers that includes the vehicle identifier │
└─────────────────────────────────────────────────────────────┘
                            │
                            ▼                         ╲── 153
┌─────────────────────────────────────────────────────────────┐
│ Causing a selectable vehicle scan tool initialization       │
│ option to be displayed on the computing device              │
└─────────────────────────────────────────────────────────────┘
                            │
                            ▼                         ╲── 154
┌─────────────────────────────────────────────────────────────┐
│ Receiving, from the computing device, a selection of the    │
│ selectable vehicle scan tool initialization option          │
└─────────────────────────────────────────────────────────────┘
                            │
                            ▼                         ╲── 155
┌─────────────────────────────────────────────────────────────┐
│ In response to receiving the selection, providing           │
│ instructions to initialize the vehicle scan tool to perform │
│ the vehicle scan tool function on the vehicle               │
└─────────────────────────────────────────────────────────────┘
                                                      ╲── 156
      ↗
     150                      FIG. 22
```

```
┌─────────────────────────────────────────────────────────────┐
│ Receiving, at a vehicle scan tool, a request for automated  │
│ vehicle scan tool initialization, the request comprising a  │
│ function identifier for a vehicle scan tool function and a  │
│ vehicle identifier for a vehicle, wherein the vehicle scan  │
│ tool is configured to display at least one navigable menu   │
│ to select from a plurality of vehicle scan tool functions   │
│ that includes the vehicle scan tool function and to select  │
│ from a plurality of vehicle identifiers that includes the   │
│ vehicle identifier                                          │
└─────────────────────────────────────────────────────────────┘
                                                    ⤸ 181
                             ▼
┌─────────────────────────────────────────────────────────────┐
│ Determining a current operating state of the vehicle scan   │
│ tool                                                        │
└─────────────────────────────────────────────────────────────┘
                                                    ⤸ 182
                             ▼
┌─────────────────────────────────────────────────────────────┐
│ Based on the current operating state of the vehicle scan    │
│ tool, making a determination to initialize the vehicle scan │
│ tool according to the request for automated vehicle scan    │
│ tool initialization                                         │
└─────────────────────────────────────────────────────────────┘
                                                    ⤸ 183
                             ▼
┌─────────────────────────────────────────────────────────────┐
│ In response to making the determination, using the function │
│ identifier and the vehicle identifier to initialize the     │
│ vehicle scan tool to perform the vehicle scan tool function │
│ on the vehicle                                              │
└─────────────────────────────────────────────────────────────┘
                                                    ⤸ 184
    ↗
   180                      FIG. 25
```

SUPPLEMENTING VEHICLE SERVICE CONTENT WITH SCAN TOOL INITIALIZATION LINKS

CROSS-REFERENCE TO RELATED DISCLOSURE

This application is a continuation of U.S. patent application Ser. No. 16/216,354, filed on Dec. 11, 2018, which is incorporated herein by reference in its entirety.

BACKGROUND

Most vehicles are serviced at least once during their useful life. In many instances, a vehicle is serviced at a facility with professional mechanics (e.g., technicians). The technicians can use any of a variety of non-computerized hand tools to service (e.g., repair) any of the wide variety of mechanical components on a vehicle. The technicians may also use computerized vehicle scan tools that can electronically communicate with a vehicle to perform tests on the vehicle or collect diagnostic information from the vehicle. While servicing a vehicle, a technician sometimes accesses information for diagnosing and/or repairing the vehicle. Such diagnostic information may be viewed by a technician on a computer workstation that is located at a different location at the facility than the vehicle. The technician may print relevant diagnostic information from the workstation, and then carry the printed material back to the vehicle. The technician may then use the printed material to manually configure a vehicle scan tool to perform functions on the vehicle. Siloing of information between different computing devices at a shop, such as a workstation and a vehicle scan tool, may lead to inefficiencies in time spent by technicians to service vehicles at the facility.

OVERVIEW

Several examples that relate to automated vehicle scan tool initialization are described herein. Some of the examples pertain to supplementing vehicle service content with selectable links to initialize a vehicle scan tool. Additional examples involve locating an available vehicle scan tool and transmitting information to the vehicle scan tool to initialize the vehicle scan tool to perform a contextually relevant vehicle service function. Yet further examples involve a vehicle scan tool configured to receive an automated vehicle scan tool initialization request and act on the request based on a current operating state of the vehicle scan tool.

Viewed from one aspect, an example embodiment takes the form of a method. The method includes receiving, by a computing device, textual vehicle service content. The method further includes identifying, by the computing device, a vehicle scan tool function relevant to associated text at a location within the textual vehicle service content. The method additionally includes modifying, by the computing device, the textual vehicle service content to include a selectable link at the location of the associated text, wherein the selectable link is selectable to initialize a vehicle scan tool to perform the identified vehicle scan tool function on a vehicle. The method further includes providing, by the computing device, the modified textual vehicle service content including the selectable link.

Viewed from another aspect, an example embodiment takes the form of a system. The system includes a vehicle scan tool and a computing device. The computing device is configured to receive textual vehicle service content. The computing device is further configured to identify a vehicle scan tool function relevant to associated text at a location within the textual vehicle service content. The computing device is also configured to modify the textual vehicle service content to include a selectable link at the location of the associated text, wherein the selectable link is selectable to initialize the vehicle scan tool to perform the identified vehicle scan tool function on a vehicle. The computing device is additionally configured to provide the modified textual vehicle service content including the selectable link.

Viewed from a further aspect, an example embodiment takes the form of a non-transitory computer readable medium having stored therein instructions executable by one or more processors to cause a computing system to perform functions. The functions include receiving textual vehicle service content. The functions further include identifying a vehicle scan tool function relevant to associated text at a location within the textual vehicle service content. The functions also include modifying the textual vehicle service content to include a selectable link at the location of the associated text, wherein the selectable link is selectable to initialize a vehicle scan tool to perform the identified vehicle scan tool function on a vehicle. The functions additionally include providing the modified textual vehicle service content including the selectable link.

Viewed from yet another aspect, an example embodiment takes the form of a system. The system includes means for receiving textual vehicle service content. The system further includes means for identifying a vehicle scan tool function relevant to associated text at a location within the textual vehicle service content. The system additionally includes means for modifying the textual vehicle service content to include a selectable link at the location of the associated text, wherein the selectable link is selectable to initialize a vehicle scan tool to perform the identified vehicle scan tool function on a vehicle. The system further includes means for providing the modified textual vehicle service content including the selectable link.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 12 is a diagram showing example mapping data in accordance with example embodiments.

FIG. 13 is a diagram showing additional example mapping data in accordance with example embodiments.

FIG. 14 shows an example PID index.

FIG. 15 shows an example component test index.

FIG. 16 shows an example functional test index.

FIG. 17 shows an example reset procedure index.

FIG. 18 shows an example of component hierarchy data.

FIG. 22 is another flowchart depicting a set of functions that can be carried out in accordance with the example embodiments.

FIG. 25 is another flowchart depicting a set of functions that can be carried out in accordance with the example embodiments.

DETAILED DESCRIPTION

Figure 1:
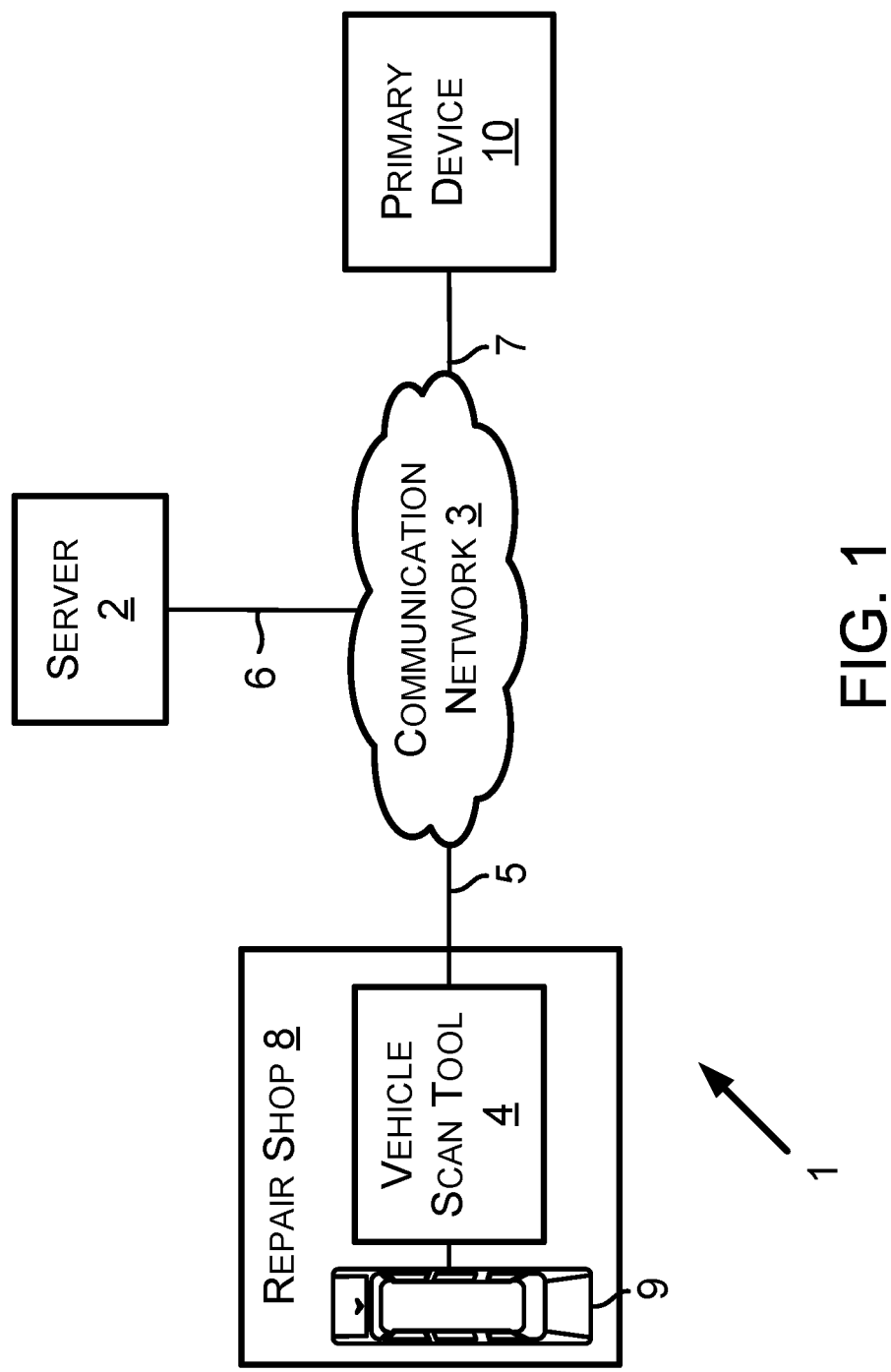
FIG. 1 is a diagram showing an example operating environment in which the example embodiments can operate.

Technicians often refer to vehicle service information while servicing vehicles. This information may be original equipment manufacturer (OEM) content provided by a manufacturer of a vehicle or vehicle component. Examples of OEM content include vehicle service procedures, vehicle specifications, shop manuals, repair manuals, technical service bulletins, and wiring diagrams. Technicians may also refer to non-OEM content from other providers. Vehicle service content may be viewed by a technician at a computer workstation before or during servicing of a vehicle. In some examples, vehicle service content may be retrieved by performing a search on a search device, which may be a computer workstation, a tablet computer, or a different computing device at a repair shop. An example search query may include identifying information for a type of vehicle as well as one or more symptom descriptors corresponding to symptoms exhibited by a vehicle to be serviced. The symptom descriptors may be diagnostic trouble codes (DTC's) that are used by manufacturers to identify different types of vehicle problems. After entering a search query, a technician may be presented with one or more relevant pieces of vehicle service information to assist in servicing the vehicle.

In order to service a vehicle, a technician may use a vehicle scan tool, which is a computing device configured to communicate with the vehicle to perform one or more vehicle service functions on the vehicle. These communications may involve sending and/or receiving vehicle data messages to a vehicle via a wired and/or wireless connection with the vehicle. Example vehicle service functions that may be performed on a vehicle using a vehicle scan tool include functional tests, component tests, and reset procedures. These vehicle service functions may involve sending one or more messages to the vehicle to test components or systems on the vehicle. In some cases, one or more messages indicating the results of tests may subsequently be received by the scan tool from the vehicle. In further examples, vehicle service functions performed using a vehicle scan tool may include retrieving data from the vehicle. Such data may include parameter identifier (PID) values.

In order to use a vehicle scan tool on a vehicle, a technician typically must identify scan tool functionality to perform and also navigate to that functionality within one or more user-navigable menus on the vehicle scan tool. However, the technician may not be aware of relevant scan tool functionality to perform on a vehicle exhibiting a given set of symptoms. Additionally, the technician may not be able to easily determine relevant scan tool functionality by looking at a printout of OEM vehicle service content. Furthermore, once relevant scan tool functionality is identified by a technician, the technician may be required to navigate through a complex series of navigable menus (e.g., involving twenty or thirty navigation steps) to configure a vehicle scan tool to perform the functions on a given vehicle. These challenges may lead to suboptimal selection of scan tool functionality and/or inefficient use of technician time at a repair shop.

Example embodiments described herein involve automating the initialization of a vehicle scan tool. More specifically, embodiments involve providing a user-selectable option to automatically configure a vehicle scan tool to perform relevant scan tool functionality. The user-selectable option may be presented to a technician on a display of a computing device that is separate from the vehicle scan tool. For instance, the computing device may be a computer workstation or a tablet computer configured to display OEM content. In other examples, the computing device may be another piece of shop equipment, such as a wheel alignment machine (e.g., an alignment rack and display interface). After a technician selects the user-selectable option, a vehicle scan tool may be automatically configured to perform a relevant vehicle service function. In some cases, the technician may then be able to initiate performance of the vehicle service function on a vehicle with a single input (e.g., a single click) at the vehicle scan tool.

In order to supplement textual vehicle service content such as OEM content, the content may first be processed to identify relevant scan tool functionality associated with text in the OEM content. When relevant scan tool functionality is identified, the OEM content may be modified to include a selectable link to initialize a vehicle scan tool. For instance, modifying the OEM content may involve converting a portion of text into a selectable link or adding a selectable link proximate to the text. In this context, proximate may be defined as within a given distance, e.g. 1 cm of the text, or within a given distance based on a height of the text, such as distance equal to two times an average height of text. Other examples are possible. In some examples, relevant scan tool functionality may be identified by identifying a particular scan tool function referenced by name in the OEM content. In further examples, previously determined relationships or mappings may be used to determine which scan tool functions to introduce at corresponding points in the OEM content. Example mappings include component-to-function mappings and symptom-to-component mappings. A vehicle component hierarchy may also be used to locate relevant scan tool functionality. The temporal phase of a procedure described by a given section of OEM content may also be considered to determine what scan tool functionality to introduce. More generally, OEM content may be modified using contextual awareness to introduce vehicle scan tool initialization links at determined points within the OEM content.

At runtime, selectable links within OEM content may be modified based on what vehicle scan tools are available to a technician or to a shop. More specifically, a technician profile that describes available scan tools for a technician and corresponding scan tool capabilities may be referenced in order to determine whether the technician has access to a scan tool that can perform relevant scan tool functions. If a scan tool that can perform a given service function is available, a selectable link within supplemented OEM content may be activated. Otherwise, the selectable link may be deactivated and a message may be provided to the technician, such as a suggestion to acquire a relevant scan tool or an offer for sale of a scan tool capable of performing the given service function. If multiple scan tools are available, a dropdown list of scan tools may be presented to allow the technician to select a scan tool to initialize. In some examples, a hierarchy of profiles may be traversed to locate a relevant scan tool. For instance, if a technician profile does not contain a scan tool that can perform a particular vehicle service function, a shop profile describing available scan tools at a repair shop may then be searched to locate an appropriate scan tool. The presentation of selectable links may be adjusted dynamically based on current availability of scan tools and/or current connected status of scan tools to corresponding vehicles.

When a vehicle scan tool initialization link is selected by a technician, instructions comprising a request for automated vehicle scan tool initialization may be sent to a selected scan tool in order to initialize the scan tool to perform a relevant scan tool function. The instructions may include a vehicle identifier for the vehicle as well as a function identifier for the scan tool function. In some examples, an identifier for a vehicle component and/or system to which the scan tool function relates may also be included in the instructions. In some cases, the text of a selectable link may be parsed at runtime and converted into a format that is understandable by the particular vehicle scan tool that is to be initialized. Once sent to a scan tool, the instructions may cause automated initialization of the vehicle scan tool based on the function identifier and the vehicle identifier so that the technician does not have to manually navigate through multiple menus to set up the scan tool.

A vehicle scan tool may be configured with a set of rules to handle incoming vehicle initialization requests. More specifically, a current operating state of the vehicle scan tool may be determined and then used to determine how to act on a given initialization request. Example operating states for the scan tool include: off, on but not connected to any vehicle, connected to a vehicle but not performing any functions, and in-use. In some examples, when the scan tool is turned on, the scan tool may be monitoring for a scan tool initialization request message. If the scan tool receives such a message when the scan tool is not already connected to a different vehicle and not already performing a vehicle service function, the scan tool may automatically configure itself to perform the requested scan tool function (e.g., so that a technician may initiate the scan tool function with a single click). By contrast, if the scan tool is connected to a different vehicle or already performing a vehicle service function, the scan tool may instead be configured to present a customized message to the user indicating that the function has been requested without initializing the scan tool. The user may then disengage from a current activity and/or vehicle to initialize the scan tool for the requested function. In further examples, one or more scan tool initialization requests for one or multiple vehicles that were sent to the scan tool may be queued on the scan tool for later recall.

Before initializing the scan tool in response to a scan tool initialization request, the scan tool may verify that the vehicle identifier in the scan tool initialization request matches the vehicle identifier of a vehicle to which the scan tool is currently connected. If the identifiers do not match, the scan tool may be configured to present a message identifying a vehicle to which the scan tool should be connected to allow the scan tool to perform the requested function. In some examples, the vehicle identifier may be a year, make, model, and engine (YMME) of the vehicle. In other examples, the vehicle identifier may include a vehicle identification number (VIN), an associated repair order identifier, and/or a license plate number as well or instead.

After the scan tool determines to act on a vehicle scan tool initialization request, the scan tool may automatically configure itself to perform a requested scan tool function on an identified vehicle. This automatic configuration may involve the scan tool parsing an extensible markup language (XML) stream or other type of data stream from the scan tool initialization request to obtain the needed vehicle information and scan tool function information. An option to initiate the requested scan tool function on the identified vehicle may then be presented to the user. In further examples, a cookie crumb trail may also be displayed on the vehicle scan tool, showing different levels which contain components of the vehicle information and/or scan tool function information that were automatically selected in the automated scan tool initialization process. The cookie crumb trail may provide a technician with an intuitive understanding of the effect of the automated scan tool initialization process. The cookie crumb trail may also allow the technician to navigate, for instance to perform a related vehicle service function on the vehicle.

Once a vehicle scan tool has been initialized, a technician may then provide an input to cause the scan tool to initiate the requested scan tool function on a vehicle. In some cases, only a single input (e.g., a click or a voice confirmation) may be needed to initiate one or more functions. The scan tool may then communicate with the vehicle to perform the functions. In some cases, data indicating the results of the functions may be received by the scan tool from the vehicle. This data may be displayed within the supplemented OEM content (e.g., proximate to the selected link that caused the scan tool to be initialized). In further examples, if the scan tool is already connected to the vehicle, certain types of functions may not require a user confirmation at all, such as collecting PID data. Instead, such functions may automatically be executed by the scan tool after a technician selects a link from the OEM content.

In accordance with examples described herein, a number of different types of computing devices may be used as the primary device which provides the context to identify relevant vehicle scan tool functionality and displays a selectable option to allow automated vehicle scan tool initialization. As described above, the primary device may be a computer workstation or tablet computer that is configured to display OEM content that has been supplemented with selectable links. In other examples, the option to initialize a vehicle scan tool may be presented at another piece of shop equipment. In particular, a wheel alignment machine may display an option to initialize a vehicle scan tool after a particular step of a vehicle service procedure has been performed on a vehicle using the wheel alignment machine. Other types of computing devices in the shop may also serve as the primary device. In such scenarios, the option to initialize a vehicle scan tool may be presented in some other format besides a selectable link, such as a yes/no question or a dropdown menu with multiple contextually relevant vehicle scan tool functions from which to select. In further examples, the primary device could be the vehicle scan tool itself or a different vehicle scan tool.

Example embodiments described herein include functions performed at a server, which may be located at a repair shop or may be remote from the repair shop. The server may communicate with a primary device to identify relevant context information in order to present options to initialize a scan tool to perform relevant vehicle service functions on a vehicle. The server may also communicate with a scan tool in order to provide instructions to properly initialize the scan tool to perform the relevant vehicle service functions. In some examples, the server may first prepare OEM content with selectable links during a first time period and then the same server or a different server may manage the presentation of the links and the initialization of vehicle scan tools during a second time period. In other examples, these functions may all be performed during the same time period.

In additional examples, some or all of the functions described herein as being performed by a server may be performed by a different computing device. In particular, it is explicitly contemplated that some or all of the functions related to identifying relevant scan tool functionality and to providing instructions to initialize a scan tool may be performed by the primary device that displays the scan tool initialization option to a technician. For instance, the primary device may be a search device that displays OEM content to a technician in response to a search query. The search device may itself supplement the OEM content with selectable links, manage the presentation of information based on available scan tools, and/or directly communicate with the scan tools to initialize the scan tools to perform relevant vehicle service functions.

In still further examples, the vehicle service content can include non-OEM content that is produced by an entity other than a vehicle manufacturer. For instance, a manufacturer of vehicle scan tools that does not manufacture vehicles can generate non-OEM content such as a real-fix tip to guide a technician based on prior instances of repairing vehicles. A real-fix tip can, but need not necessarily, include data based on a complaint, a cause, and a correction listed on a repair order generated by a repair shop. A real-fix tip may be modified to include selectable links corresponding to scan tool functions that can be used to confirm the cause listed on the real-fix tip is applicable to a different vehicle, but of the same year, make and model. The real-fix tip may be modified to include selectable links corresponding to scan tool functions that can be used to perform the correction listed on the real-fix tip for the different vehicle or to confirm that the correction listed on the real-fix tip and performed to the different vehicle actually repaired the different vehicle.

FIG. 1 is a diagram showing an example operating environment 1 in which example embodiments can operate. The operating environment 1 includes a server 2, a communication network 3, a vehicle scan tool 4, communication links 5, 6, and 7, a repair shop 8, a vehicle 9, and a primary device 10.

The communication network 3 can comprise the communication links 5, 6, and 7 as well as other communication links (not shown). The communication network 3 and the communication links 5, 6, and 7 can include various network components such as switches, modems, gateways, antennas, cables, transmitters, and/or receivers. The communication network 3 can comprise a wide area network (WAN). The WAN can carry data using packet-switched and/or circuit-switched technologies. The WAN can include an air interface or wire to carry the data. The communication network 3 can comprise a network or at least a portion of a network that carries out communications using a Transmission Control Protocol (TCP) and the Internet Protocol (IP), such as the communication network commonly referred to as the Internet.

The repair shop 8 can comprise a variety of shop tools, such as brake lathes, wheel alignment machines, wheel balancers, and/or diagnostic devices for diagnosing vehicles. A shop tool can comprise the vehicle scan tool 4. As shown in FIG. 1, the vehicle scan tool 4 is located within the repair shop 8. The vehicle scan tool 4, however, can operate inside and/or outside of the repair shop 8. For example, the vehicle scan tool 4 can be used within the vehicle 9 as the vehicle 9 is driven on a road outside of the repair shop 8 for any of a variety of purposes. The server 2 can be scaled so as to be able to serve any number of vehicle scan tools, such as one vehicle scan tool (as shown in FIG. 1), one hundred vehicle scan tools, one thousand vehicle scan tools, or some other number of vehicle scan tools.

A vehicle, such as vehicle 9, is a mobile machine that can be used to transport a person, people, or cargo. As an example, a vehicle discussed herein can be driven and/or otherwise guided along a path (e.g., a paved road or otherwise) on land, in water, or in the air or outer space. As another example, a vehicle discussed herein can be wheeled, tracked, railed, or skied. As yet another example, a vehicle discussed herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, a vehicle discussed herein can include or use any appropriate voltage or current source, such as a battery, an alternator, a fuel cell, and the like, providing any appropriate current or voltage, such as about 12 volts, about 42 volts, and the like. As still yet another example, a vehicle discussed herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can include an ECU, a data link connector (DLC), and a vehicle communication link that connects the DLC to the ECU.

A vehicle manufacturer can build various quantities of vehicles each calendar year (e.g., January 1$^{st}$ to December 31$^{st}$). In some instances, a vehicle manufacturer defines a model year for a particular vehicle model to be built. The model year can start on a date other than January 1$^{st}$ and/or can end on a date other than December 31$^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define a vehicle identifier for each vehicle built by the vehicle manufacturer. A particular vehicle identifier identifies particular sets of vehicles (e.g., all vehicles of a particular vehicle model for a particular vehicle model year or all vehicles of a particular vehicle model for a particular vehicle model year with a particular set of one or more vehicle options).

As an example, a particular vehicle identifier can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifier can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota®/Camry®/4Cyl, in which "2004" represents the model year the vehicle was built, "Toyota®" represents the name of the vehicle manufacturer Toyota® Motor Corporation, Aichi Japan, "Camry®" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle using a particular vehicle identifier. These other features can be identified in various manners, such as a regular production option (RPO) code, such as the RPO codes defined by the General Motors® Company LLC, Detroit Mich.

A vehicle communication link within a vehicle can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

An ECU can control various aspects of vehicle operation or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test or a reset procedure with respect to an ECU can comprise the vehicle scan tool 4 transmitting a VDM to a vehicle. A VDM received at an ECU can comprise a PID request. A VDM transmitted by an ECU can include a response comprising the PID and a PID data value for the PID.

The primary device 10 is computing device with a display interface. The primary device 10 may be configured to display vehicle service information to a technician. The primary device 10 may be located at repair shop 8 proximate to vehicle 9, at repair shop 8 but remote from vehicle 9, or remote from repair shop 8. In example embodiments, the primary device 10 is a computer workstation, a tablet computer, a smartphone, a search device, a wheel alignment machine, a different piece of shop equipment, or a vehicle scan tool.

Figure 2:
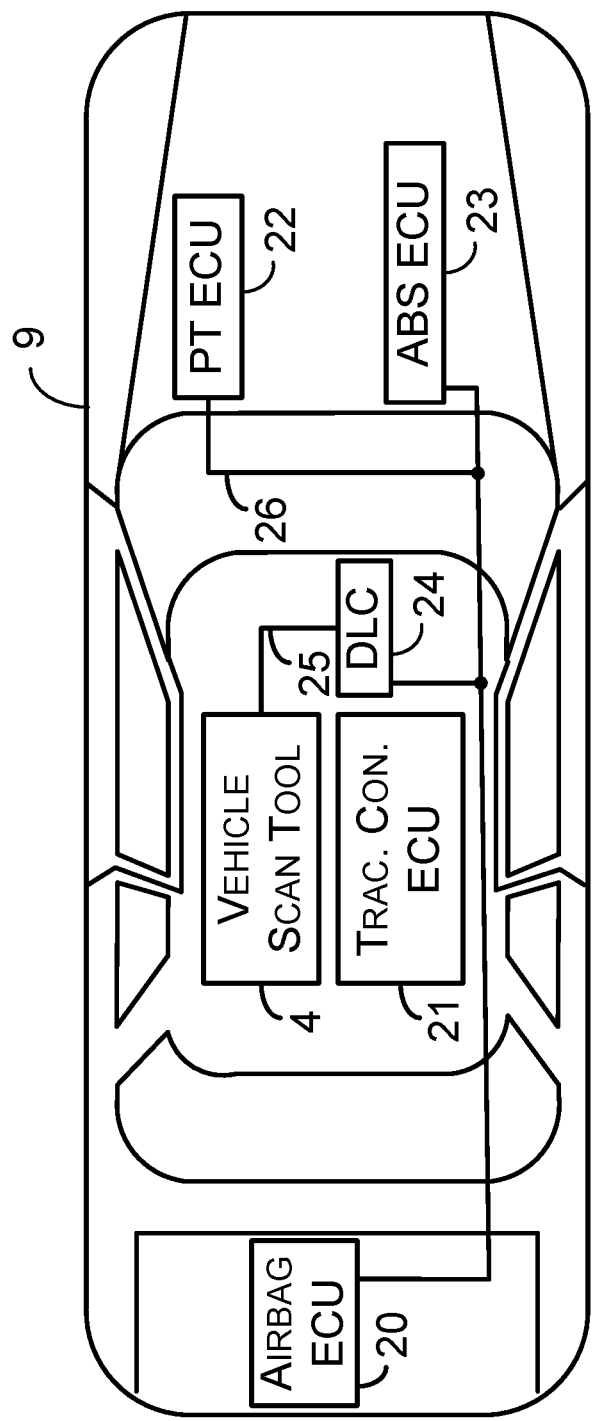
FIG. 2 is a diagram of a vehicle showing example placement of a vehicle scan tool.

Next, FIG. 2 shows example details of the vehicle 9 and example placement of the vehicle scan tool 4 within the vehicle 9. In particular, FIG. 2 shows the vehicle 9 includes an airbag system ECU 20, a traction control system ECU 21, a powertrain system ECU 22, an anti-lock brake system (ABS) ECU 23, and a DLC 24, each of which is connected to a vehicle communication link 26. Other examples of the ECU within the vehicle 9 are also possible. The DLC 24 can, for example, be located within a passenger compartment of the vehicle 9, within an engine compartment of the vehicle 9, or within a storage compartment within the vehicle 9. The vehicle scan tool 4 can include and/or connect to the DLC 24 via a DLC-to-scan-tool communication link 25. The vehicle scan tool 4 is typically removed after the vehicle 9 has been serviced at the repair shop 8. In that way, the vehicle scan tool 4 can be used to service other vehicles after those vehicles arrive at the repair shop 8.

The DLC 24 can comprise a connector such as an OBD I connector, an OBD II connector, or some other connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Aptiv® LLC of Dublin, Ireland. The DLC 24 can include conductor terminals that connect to a conductor in a vehicle. For instance, the DLC 24 can include connector terminals that connect to conductors that respectively connect to positive and negative terminals of a vehicle battery. The DLC 24 can include one or more conductor terminals that connect to a conductor of the vehicle communication link such that the DLC 24 is operatively connected to the ECU within the vehicle 9.

Figure 3:
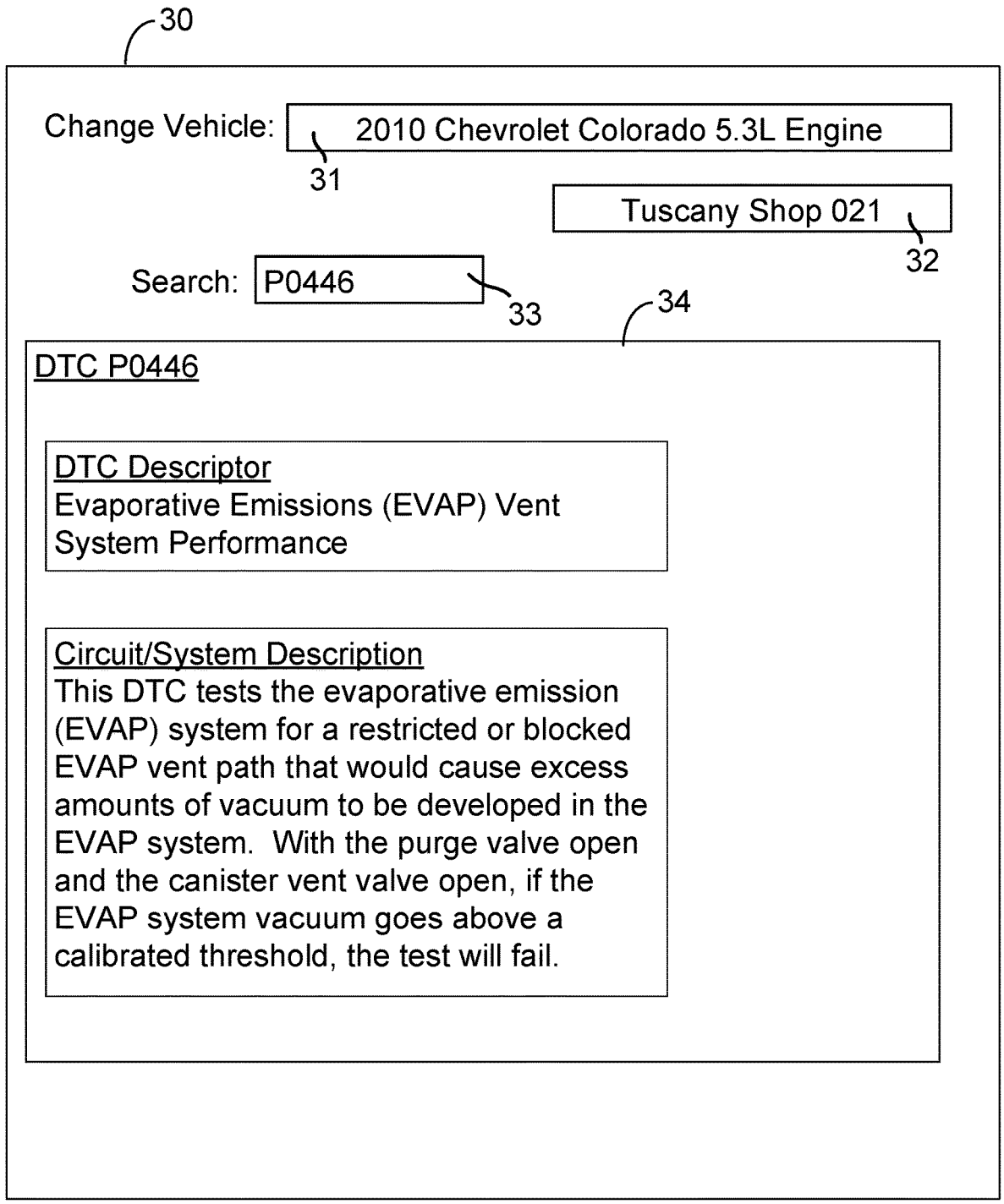
FIG. 3 shows example vehicle service information displayed on a computing device.

Next, FIG. 3 shows example vehicle service information displayed on a computing device. More specifically, display interface 30 is a display of a computing device that is configured to display vehicle service information. The vehicle service information may be OEM content from one or more vehicle or vehicle component manufacturers. The vehicle service information may be textual information and/or may include other forms of media, including images, video, and/or audio content. In some examples, the computing device is a fixed computer workstation at a repair shop, a mobile computing device such as a touchpad device or smartphone, a laptop computer, or a different type of computing device at a vehicle repair shop.

In some examples, the computing device may be a search device that provides vehicle service information in response to a search query. In reference to FIG. 3, display interface 30 includes a prompt for a vehicle identifier 31 and a search query 33. In this example, the vehicle identifier 31 includes a year, make, model, and engine of a vehicle, which identifies a 2010 General Motors® Chevrolet® Colorado® with a 5.3 L Engine. The Chevrolet® Colorado® included in FIGS. 3 through 6 is a registered trademark of General Motors®. In other examples, the vehicle identifier 31 may represent a different set of vehicles. In further examples, certain types of textual vehicle service information may apply generally to multiple sets of vehicles. Additionally, in this example, the search query 33 is a vehicle symptom described by the DTC of P0446. In other examples, a different type of search query may be used, such as a keyword search. The display interface 30 additionally indicates the repair shop 32 that the computing device is located at, which in this case is Tuscany Shop 021.'

In response to the search query 33, textual vehicle service information 34 relevant to DTC P0446 for vehicles described by vehicle identifier 31 may be presented to a technician on display interface 30. In some examples, the textual vehicle service information 34 may be OEM content. The textual vehicle service information 34 may be retrieved by a server and provided from the server to the computing device to display on display interface 30. In this example, a DTC descriptor and a Circuit/System Descriptor are included within textual vehicle service information 34. In further examples, a variety of other types of service information may be displayed as well or instead. In some examples, textual vehicle service information 34 may take the form of a scrollable website with multiple pages of vehicle service information.

Figure 4:
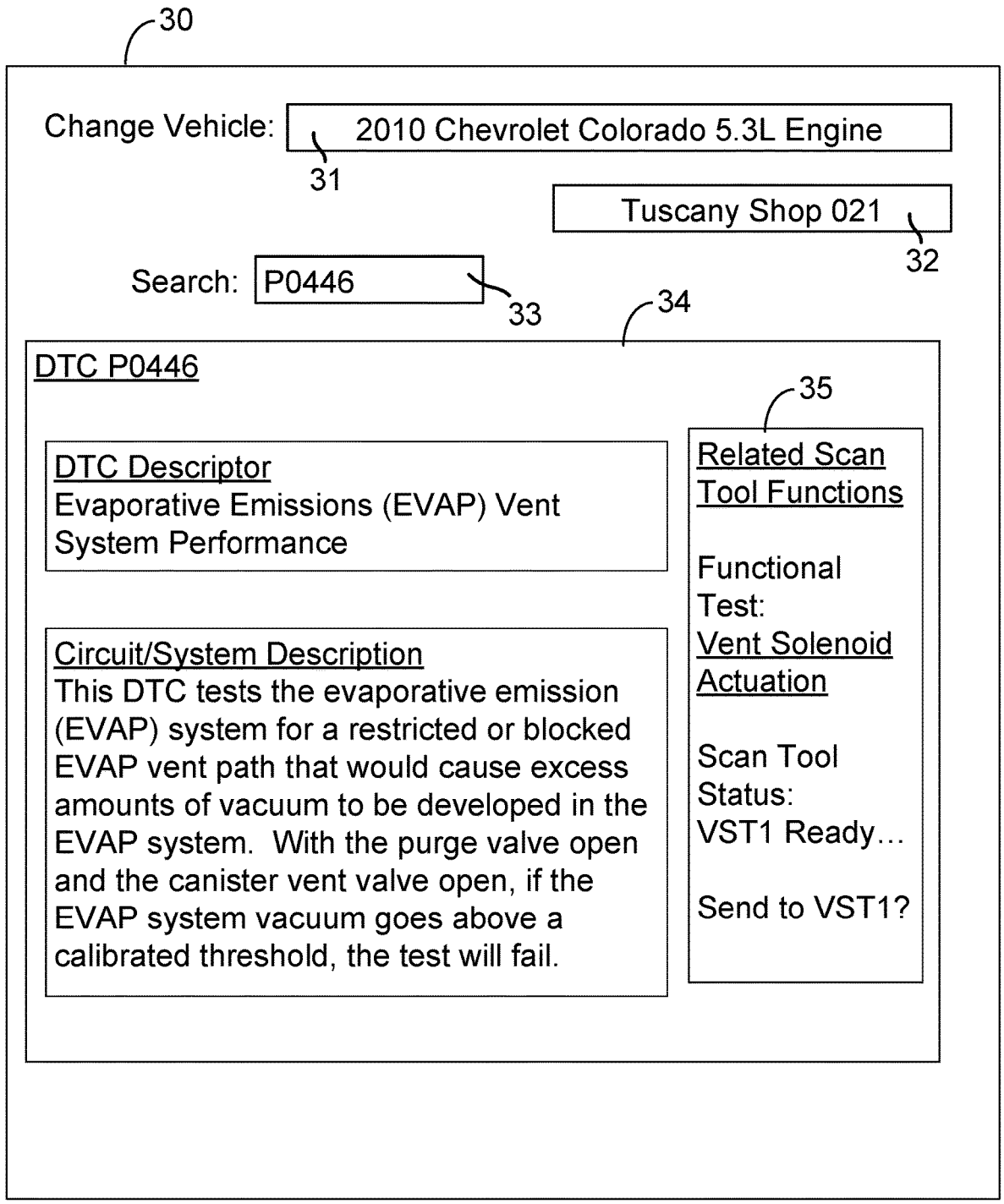
FIG. 4 shows example vehicle service information and a selectable link displayed on a computing device.

Next, FIG. 4 shows example vehicle service information and a selectable link displayed on a computing device. More specifically, in FIG. 4, display interface 30 includes related scan tool functions 35, including a selectable link to initialize a vehicle scan tool to perform a functional test named "Vent Solenoid Actuation." This functional test may be identified by a server as contextually relevant scan tool functionality to include in the illustrated portion of textual vehicle service information 34. If a technician clicks on the selectable link, a vehicle scan tool may be automatically configured to perform the functional test on a vehicle.

In some examples, the illustrated selectable link to initialize a vehicle scan tool to perform the functional test may be included within textual vehicle service information 34 at a point in time before the search query 33 is entered at display interface 30. More specifically, a server may parse the textual information in OEM content and identify contextually relevant scan tool functionality for which to introduce selectable links. OEM content that has been modified to include selectable links may be stored in a database. Subsequently, when the OEM content is provided for display (e.g., on display interface 30), the presentation of selectable links may be adjusted based on currently available scan tools for a technician and/or shop.

At runtime, a server may evaluate scan tools available to a technician by referencing a user profile associated with a user identifier (e.g., a technician identifier and/or a shop identifier). In particular, a technician may be identified as being logged in to the computing device displaying OEM content. A technician identifier for the technician may be used to locate a technician profile describing registered vehicle scan tools and corresponding scan tool capabilities. In reference to FIG. 4, vehicle scan tool VST1 may be identified as an available vehicle scan tool for the technician who is logged in and provided the search query 33 at display interface 30. Additionally, the technician profile containing VST1 may indicate that VST1 is capable of performing the "Vent Solenoid Actuation" functional test on a vehicle described by vehicle identifier 31. Accordingly, the selectable link for this functional test may be activated within the displayed OEM content and an option to send the functional test to VST1 may be presented. In further examples, where a technician profile for the technician does not include a vehicle scan tool capable of performing the functional test, a shop profile may instead be referenced. For instance, VST1 may be an available tool at repair shop 32 that is capable of performing the functional test.

Upon selection of the selectable link by a technician, a server may transmit instructions to initialize VST1 to perform the "Vent Solenoid Actuation" functional test on a vehicle described by vehicle identifier 31. The instructions may include the vehicle identifier 31 and an identifier for the functional test. The instructions may additionally include an identifier for the vehicle system or component to be tested (e.g., the EVAP system). In some examples, these instructions may be specifically generated in a format interpretable by VST1. In particular, a server may parse the text of the previously inserted selectable link and convert the information (e.g., vehicle identifier, test identifier, and/or system/component identifier) into a customized message to transmit to VST1.

Figure 5:
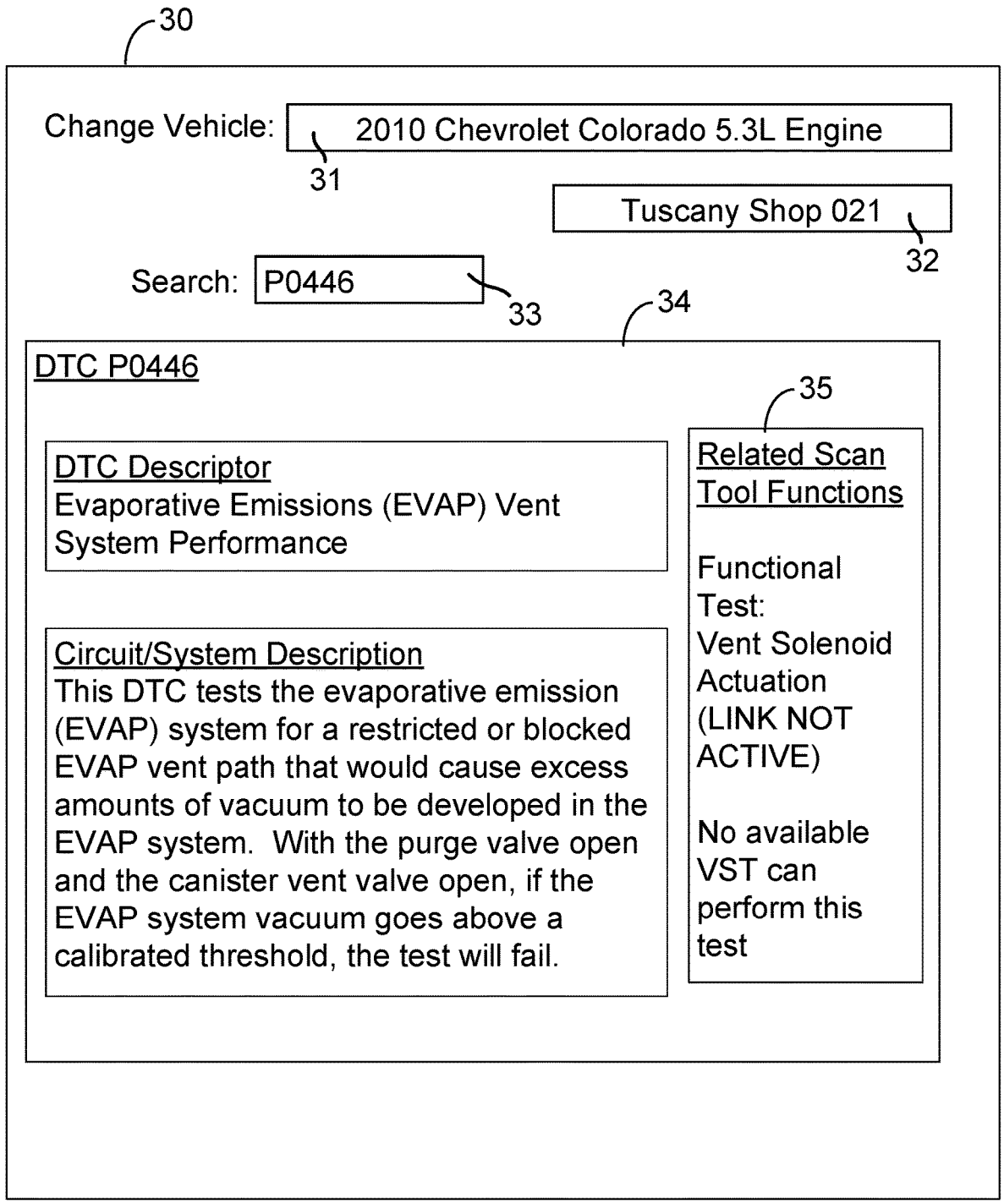
FIG. 5 shows example vehicle service information and a deactivated selectable link displayed on a computing device.

Next, FIG. 5 shows example vehicle service information and a deactivated selectable link displayed on a computing device. More specifically, a server may determine that there are no vehicle scan tools associated with the technician that can perform the "Vent Solenoid Actuation" functional test. Accordingly, the presentation of the selectable link within related scan tool functions 35 may be adjusted so that the link cannot be selected by the technician. The appearance of the link may be dynamic so that if a vehicle scan tool that can perform the functional test becomes available for the technician, the link will become active again within display interface 30.

In some examples, a selectable link which has been added to OEM content may still be visible even when there is no available scan tool that can be initialized to perform the vehicle service function. Accordingly, a technician may be made aware of the existence of the relevant vehicle scan tool function while browsing the OEM content. In further examples, the message presented to the technician may be adjusted to include an offer for sale for a vehicle scan tool that can perform the relevant scan tool functionality.

Figure 6:
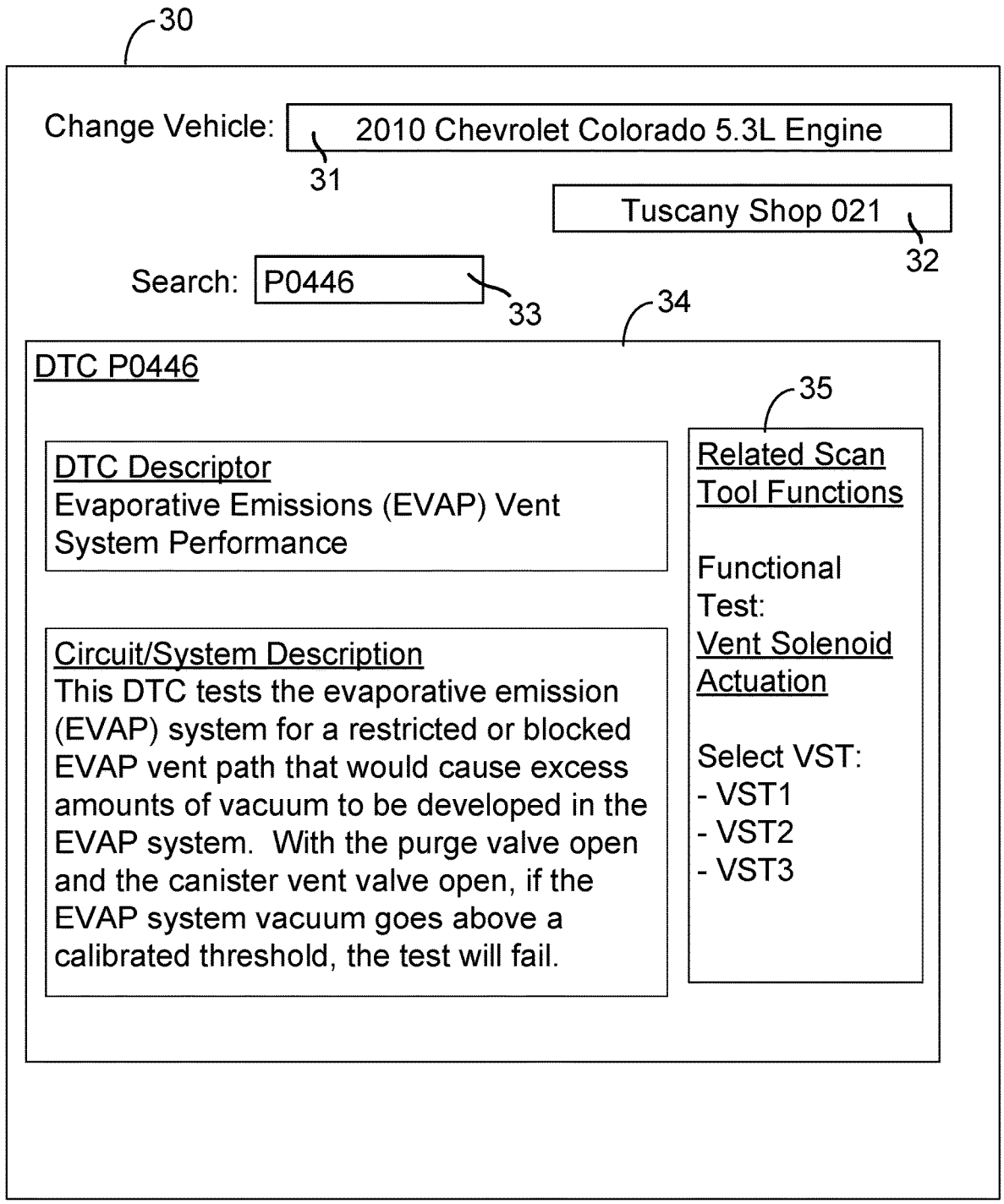
FIG. 6 shows example vehicle service information, a selectable link, and a list of vehicle scan tool identifiers displayed on a computing device.

Next, FIG. 6 shows example vehicle service information, a selectable link, and a list of vehicle scan tool identifiers displayed on a computing device. More specifically, in situations where multiple vehicle scan tools associated with a technician are identified as being available and capable of performing relevant vehicle scan tool functionality, a selectable list of vehicle scan tool identifiers corresponding to the vehicle scan tools may be presented to allow the technician to select a vehicle scan tool to initialize. In reference to FIG. 6, three vehicle scan tool identifiers are presented as options: VST1, VST2, and VST3. Each of the three vehicle scan tools is capable of performing the "Vent Solenoid Actuation" test on the vehicle identified by vehicle identifier 31. In order to send the functional test to a scan tool, the technician may be required to select a vehicle scan tool identifier to initialize a vehicle scan tool from the list of available options.

In further examples, when multiple vehicle scan tools are available and capable of performing a relevant vehicle service function, a vehicle scan tool may be selected automatically from the available scan tools. In some examples, a vehicle scan tool with the highest capability level to perform the vehicle service function may be selected and presented to the user within OEM content. For instance, the capability level may be based on which scan tool from the set of available scan tools has a latest software revision installed.

In additional examples, a vehicle scan tool may be selected automatically based on vehicle connected status. For instance, if there is a vehicle scan tool that is already connected to the vehicle to be serviced, that vehicle scan tool may be automatically selected for initialization. If none of the vehicle scan tools are already connected to the vehicle, a vehicle scan tool which is currently not connected to any vehicle may instead be selected. In further examples, whether each scan tool is currently performing a scan tool function may be considered when selecting between vehicle scan tools as well or instead. In yet further examples, future scheduling information for each of the vehicle scan tools may be considered when selecting between vehicle scan tools.

In further examples, rather than automatically selecting a single vehicle scan tool to present to the technician, a list of multiple vehicle scan tools may instead be ordered in priority based on various factors, including capabilities level, connected status, and active status. In additional examples, some or all of these factors may be displayed within a list of vehicle scan tools from which the technician may select a vehicle scan tool to initialize.

In further examples, a variety of different types of OEM content and other vehicle service content may be supplemented with selectable links. In some examples, the OEM content may be or include a wiring diagram that illustrates the wiring schematic of a portion of a vehicle (e.g., ground locations, wiring locations, and/or components that are connected by the wiring). The wiring diagram may be modified to include selectable links corresponding to different vehicle components in the wiring diagram. Each selectable link may be selectable to initialize the vehicle scan tool to perform a respective vehicle scan tool function related to a corresponding vehicle component in the wiring diagram. For instance, a selectable link in the wiring diagram may cause the initialization of a scan tool to show PID data related to a component in the wiring diagram or to perform a test related to a component in the wiring diagram.

Figure 7:
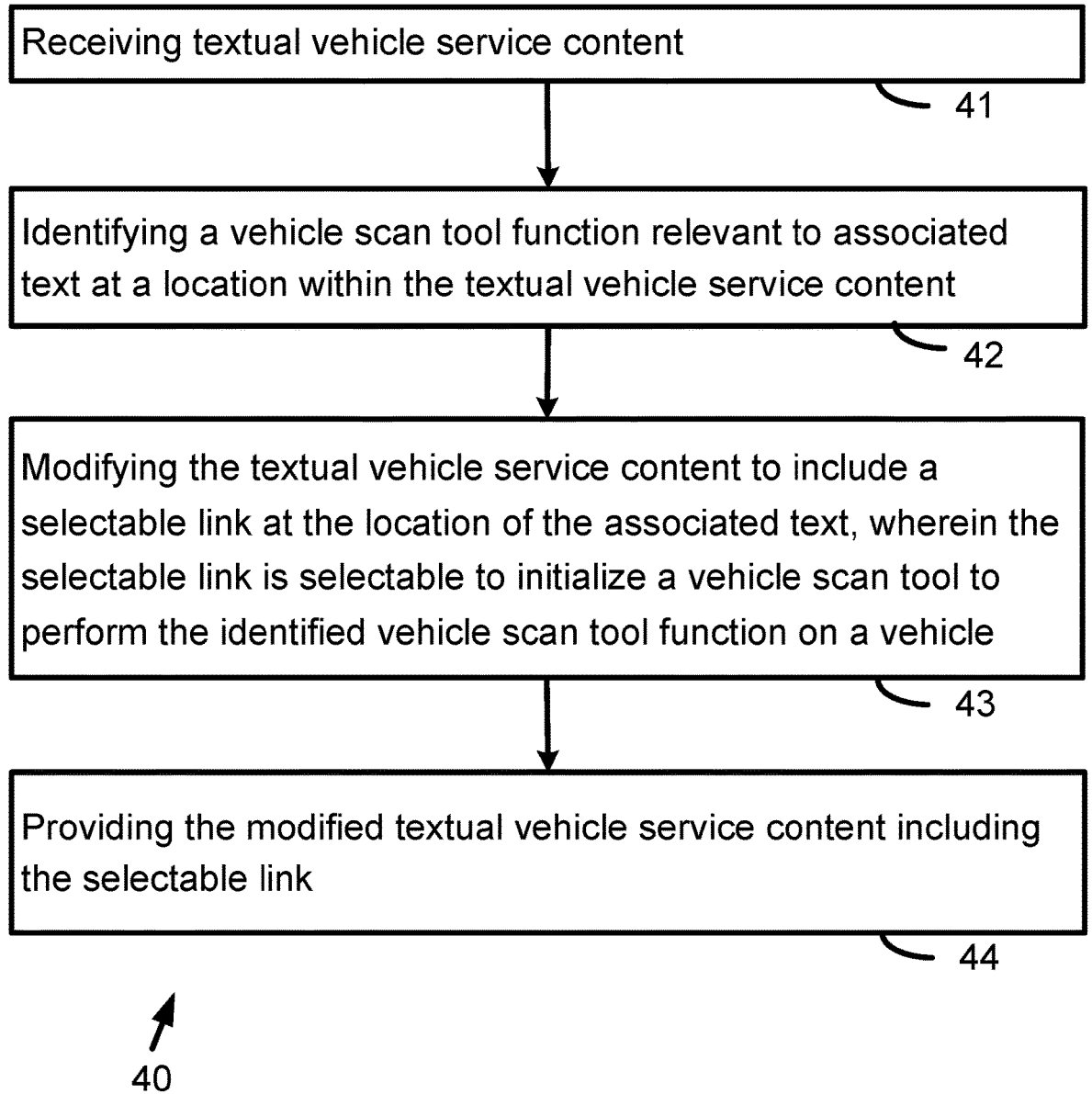
FIG. 7 is a flowchart depicting a set of functions that can be carried out in accordance with example embodiments.

Next, FIG. 7 shows a flowchart depicting a set of functions 40 (or more simply "the set 40") that can be carried out in accordance with the example embodiments described in this description. The set 40 includes the functions shown in blocks labeled with whole numbers 41 through 44 inclusive. The following description of the set 40 includes references to elements shown in other figures described in this description, but the functions of the set 40 are not limited to being carried out only by the referenced elements. A variety of methods can be performed using all of the functions shown in the set 40 or any proper subset of the functions shown in the set 40. Any of those methods can be performed with other functions such as one or more of the other functions described in this description. In some examples, the set 40 may be carried out by a server, such as server 2 of FIG. 1.

In further examples, some or all of the set 40 may be carried out by a different device, such as primary device 10 of FIG. 1.

Block 41 includes receiving textual vehicle service content. The textual vehicle service content may be OEM content provided by a vehicle or component manufacturer. The vehicle service content may include other forms of media besides textual information, including diagrams, pictures, video, etc. In some examples, the textual vehicle service information may be received at a time before the information is requested for viewing. For instance, OEM content from various sources may be received, processed, and customized to include selectable links. The customized OEM content may be stored within a database. The customized OEM content may later be retrieved from the database and provided in response to search queries or other viewing requests. In other examples, textual vehicle service content may be received in response to a request to view the content. In such examples, the content may be supplemented with selectable links and immediately provided for viewing on a display device.

Next, block 42 includes identifying a vehicle scan tool function relevant to associated text at a location within the textual vehicle service content. In particular, the content may be processed to find contextually relevant scan tool functions for which to provide selectable scan tool initialization links at different points within the content. In some examples, specific vehicle scan tool functions may be identified by name within OEM content, and links may be inserted for these vehicle scan tool functions. In other examples, appropriate vehicle scan tool functions to introduce into OEM content may be identified in a number of different manners.

In some examples, relevant vehicle scan tool functions may be identified by referencing one or more predetermined and saved mappings. The mappings may be learned relationships, and may include component-to-function mappings, symptom-to-component mappings, and/or other mappings as described herein. In further examples, a vehicle component hierarchy may also be referenced to identify contextually relevant scan tool functionality. The temporal vehicle service phase of a vehicle service procedure to which OEM content relates may also be considered to find appropriate locations to insert links for contextually relevant scan tool functions.

As an example, the OEM content may be an article about fuel injector testing. If the article references specific injector tests by name that can be performed by a vehicle scan tool, selectable links may be inserted for those tests. If no tests are referenced but the injector component is referenced by name, then a component-to-function mapping may be used to locate relevant scan tool functions or tests. In some examples, all relevant scan tool functions or tests for the component may be introduced as selectable links. In other examples, a service procedure timeline may be considered to determine which scan tool functions or tests to introduce. A service procedure timeline divides a vehicle service procedure into a sequence of discrete temporal phases (e.g., a before-repair phase, a repair phase, and an after-repair phase). Vehicle scan tool functions may then be categorized based on the procedural phase or phases to which they relate in order to determine when to introduce the scan tool functions. For instance, if a portion of an article describes after-repair information for the injector and therefore the temporal vehicle service phase is determined to be an after-repair phase, then selectable links for one or more reset procedures may be introduced at that point in the article.

In further examples, a vehicle component may not be referenced by name in OEM content, but a symptom may be referenced (e.g., a DTC or a textual descriptor for a symptom). A symptom-to-component mapping may then be referenced to identify relevant vehicle components for the symptom. A component-to-function mapping may then be used to locate appropriate scan tool functions for which to introduce selectable links. In these examples and others, without the inserted links, a technician may be unaware of the relevant scan tool functions that may be useful to perform on the vehicle in association with the OEM content.

In additional examples, if a vehicle component is referenced by name but no appropriate scan tool function exists for the component, a component hierarchy may be considered to locate a system to which the component belongs. A system diagnosis (e.g., a fuel system or an ignition system) can then lead to relevant vehicle scan tool functions to introduce within OEM content. More generally, multiple levels of a component hierarchy tree may be traversed up or down to locate relevant scan tool functionality.

In further examples, the relevant scan tool functionality introduced into OEM content in the form of a selectable link may be a filtered PID list. In particular, if an article is about a fuel injector, a selectable link may be inserted that automatically sets up a PID list of contextually relevant PIDs to view on the vehicle scan tool. A filtered PID list that is tailored to the OEM content may allow a technician to quickly view relevant PID values without having to manually select relevant PIDs from a long list of available PIDs on a vehicle scan tool.

Next, block 43 includes modifying the textual vehicle service content to include a selectable link at the location of the associated text. The selectable link is selectable to initialize a vehicle scan tool to perform the identified vehicle scan tool function on a vehicle. In some examples, text within OEM content may be directly converted into a selectable link (e.g., a hyperlink). In further examples, selectable links may be inserted proximate to or on top of associated text within the OEM content. The exact positioning and appearance of selectable links may be varied as well.

Next, block 44 includes providing the modified textual vehicle service content including the selectable link. In some examples, the modified content may be provided to a display device to display the content and allow for selection of the link. In other examples, the modified content may instead be stored in a database and later retrieved for display, for instance, in response to a search query that leads to the OEM content. In some examples, a first server may receive and supplement OEM content with selectable links, and a second server may later provide the supplemented OEM content for display and act on selections of selectable links to cause vehicle scan tools to automatically be initialized to perform contextually relevant vehicle service functionality.

Figure 8:
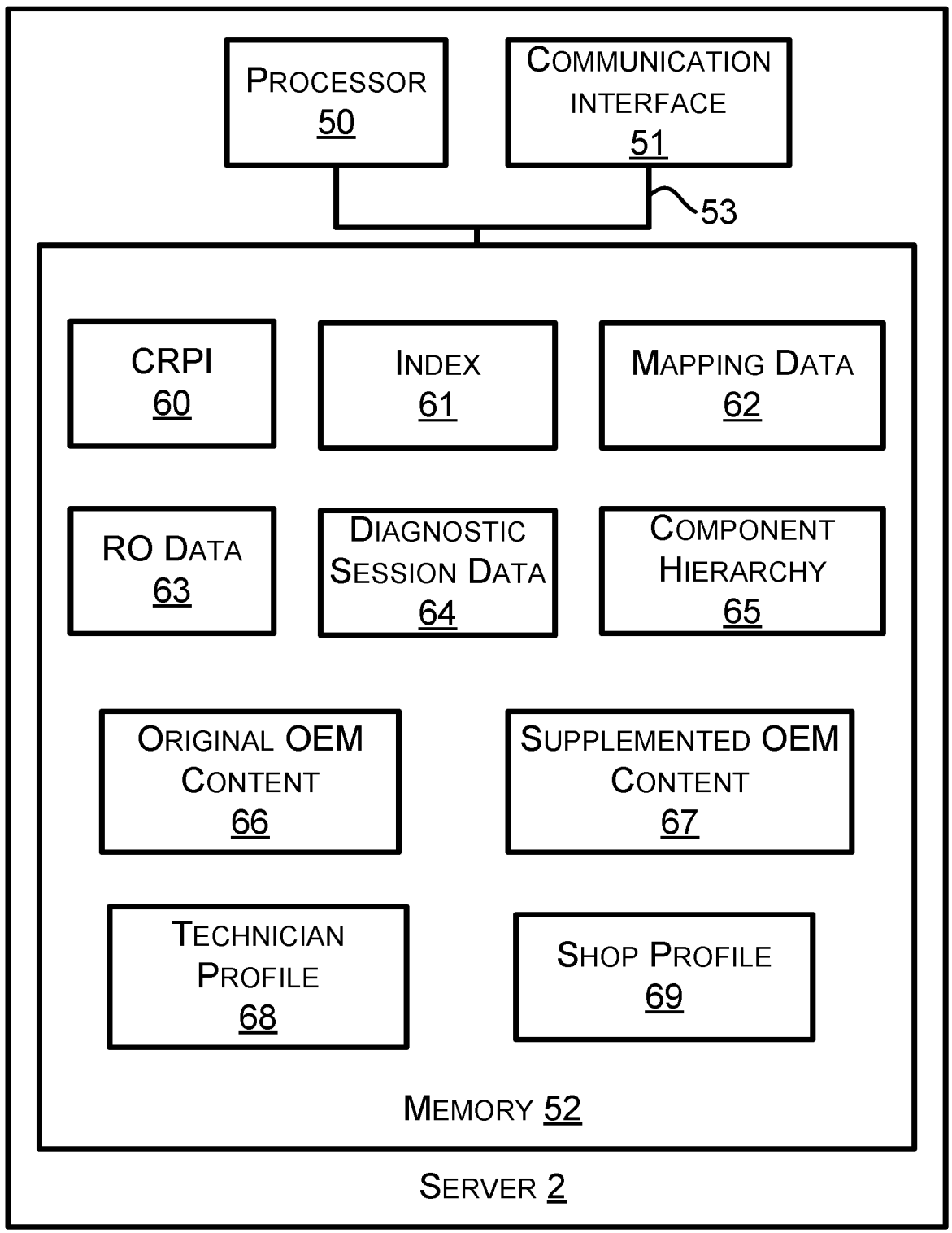
FIG. 8 is a block diagram of an example server.

Next, FIG. 8 is a block diagram of the server 2. As shown in FIG. 8, the server 2 comprises a processor 50, a communication interface 51, and a memory 52. Two or more of those components can be communicatively coupled or linked together via a system bus, network, or other connection mechanism 53.

A processor such as the processor 50 or any other processor discussed in this description can comprise one or more processors. A processor can include a general purpose processor (e.g., an INTEL® single core microprocessor or an INTEL® multicore microprocessor), or a special purpose processor (e.g., a digital signal processor, a graphics processor, an embedded processor, or an application specific integrated circuit (ASIC) processor). A graphics processor may be configured to access and use a memory for creating, or retrieving GUIs to display on a display. An embedded processor can include a central processing unit chip used in a system that is not a general-purpose workstation, laptop, or desktop computer. A processor can be configured to execute computer-readable program instructions (CRPI). For example, the processor 50 can execute CRPI 60 stored in the memory 52. A processor can be configured to execute hard-coded functionality in addition to or as an alternative to software-coded functionality (e.g., via CRPI). The at least one processor of the processor 50 can be programmed to perform any function or combination of functions described herein as being performed by the server 2.

A memory such as the memory 52 or any other memory discussed in this description can include one or more memories. A memory can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory memory can include, for example, CRPI provided over a communication link, such as a communication link which is connected to or is part of the communication network 3. The communication link can include a digital or analog communication link. The communication link can include a wired communication link including one or more wires or conductors, or a wireless communication link including an air interface.

A "memory" can be referred to by other terms such as a "computer-readable memory," a "computer-readable medium," a "computer-readable storage medium," a "storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory.

The memory 52 stores computer-readable data, such as the CRPI 60, an index 61, mapping data 62, repair order (RO) data 63, diagnostic session data (DSD) 64, a component hierarchy 65, original OEM content 66, supplemented OEM content 67, technician profile 68, and/or shop profile 69.

The RO data 63 can comprise data from one or more ROs. The data from each RO can be stored within the RO data 63 as a separate record pertaining to a vehicle of the set of vehicles being worked on at a repair shop. The RO data 63 can comprise RO data aggregated from multiple ROs. The RO data 63 may be used by the server 2 to generate any or all of mapping data 62. The RO data 63 can comprises data from one or more ROs that indicate particular vehicle identifying information, at least one symptom, and a particular vehicle component. The server 2 can receive RO data that indicates components actually replaced on a vehicle to repair a symptom identified on an RO. The RO data 63 can comprise and/or be included within a computer-readable file, such as an extensible markup language (XML) file.

The DSD 64 can comprise data the server 2 can use to determine an operating state of the vehicle scan tool 4. The data the server 2 uses to determine an operating state of the vehicle scan tool 4 can include a vehicle identifier, data indicating an elapsed time since the server 2 last received a communication from the vehicle scan tool 4, data indicating the most recent type of scan tool function transmitted to the vehicle scan tool 4, and/or data indicating a scan tool function has been completed on a particular vehicle.

The DSD 64 can comprise data indicative of the determined operating state of one or more vehicle scan tools identified in technician profile 68 and/or shop profile 69, such as the vehicle scan tool 4. Examples of the operating state include (i) the vehicle scan tool 4 is connected to the server 2 or (ii) the vehicle scan tool 4 is not connected to the server 2 (i.e., disconnected from the server 2). More specifically, vehicle scan tool 4 may be considered to be connected to the server 2 if the vehicle scan tool 4 can receive messages from the server 2 via a wireless or other connection. In some examples, a separate login at the vehicle scan tool 4 may be required to initially connect to the server 2. In further examples, periodic beacon signals may be sent from server 2 to vehicle scan tool 4 to determine if the vehicle scan tool 4 is still connected to the server 2. Additional examples of the operating state include (iii) the vehicle scan tool 4 is connected to a particular vehicle (e.g., the vehicle 9), (iv) the vehicle scan tool 4 is no longer connected to the particular vehicle (i.e., disconnected from the particular vehicle), (v) the vehicle scan tool 4 is in an automatic initialization mode for the particular vehicle, and (vi) the vehicle scan tool 4 is not in the automatic initialization mode for the particular vehicle (e.g., in a manual mode). In some examples, the vehicle scan tool 4 may be connected to the particular vehicle through a harness or other physical connection. In other examples, the vehicle scan tool 4 may be wirelessly connected to the particular vehicle.

The DSD 64 can also comprise data indicating a diagnostic session at the vehicle scan tool 4 is active or inactive. The server 2 can determine a new diagnostic session is active upon receiving a vehicle identifier for a particular vehicle while the DSD 64 does not include data indicating a diagnostic session is active for the particular vehicle. The server 2 can determine an active diagnostic session for a particular vehicle has transitioned to inactive upon receiving a vehicle identifier for a different particular vehicle. The server 2 can determine an active diagnostic session for a particular vehicle has transitioned to an inactive session upon determining a threshold amount of time has elapsed since a particular activity of the active diagnostic session. As an example, the particular activity can comprise receiving a request from the vehicle scan tool 4, receiving a communication indicating the vehicle scan tool 4 is connected to the communication network 3 and/or transmitting a response with a scan tool function to the vehicle scan tool 4. Other examples of the particular activity are also possible.

The CRPI 60 can comprise a plurality of program instructions. The CRPI 60 and any other CRPI described in this description can include data structures, objects, programs, routines, or other program modules that can be accessed by a processor and executed by the processor to perform a particular function or group of functions and are examples of program codes for implementing steps for methods described in this description.

In general, the CRPI 60 can include program instructions to cause the server 2 to perform any function described herein as being performed by the server 2 or to cause any component of the server 2 to perform any function herein as being performed by that component of the server 2. As an example, the CRPI 60 can include program instructions to perform the set of functions 40 shown in FIG. 7 and/or the set of functions 150 shown in FIG. 22.

As another example, the CRPI 60 can include program instructions to perform session management with respect to the vehicle scan tool 4. The processor 50 can use the DSD 64 to determine the operating state of the vehicle scan tool 4. Based on the operating state of the vehicle scan tool 4, the processor 50 can provide the vehicle scan tool 4 with instructions to initialize the vehicle scan tool to perform a contextually relevant scan tool function.

Upon and/or in response to determining that the vehicle scan tool 4 has completed a vehicle scan tool function on the particular vehicle, the processor 50 can provide a session-change response to the vehicle scan tool 4 to configure the vehicle scan tool 4 to perform a previously-provided scan tool function or a different scan tool function. The session-change response can include the previously-provided scan tool function or the different scan tool function. In some examples, the previously-provided or different scan tool function may relate to a different vehicle than the particular vehicle. In further examples, the session-change response may cause the vehicle scan tool 4 to switch to a manual (e.g., user-configurable) mode.

A communication interface such as the communication interface 51 or any other communication interface discussed in this description can include one or more communication interfaces. Each communication interface can include one or more transmitters configured to transmit data onto a network, such as the communication network 3. The data transmitted by the communication interface 51 can comprise any data described herein as being transmitted, output, and/or provided by the server 2. Moreover, each communication interface can include one or more receivers configured to receive data carried over a network, such as the communication network 3. The data received by the communication interface 51 can comprise any data or request described herein as being received by the server.

A transmitter can transmit radio signals carrying data and a receiver can receive radio signals carrying data. A communication interface with that transmitter and receiver can include one or more antennas and can be referred to as a "radio communication interface," an "RF communication interface," or a "wireless communication interface." The radio signals transmitted or received by a radio communication interface can be arranged in accordance with one or more wireless communication standards or protocols such as an Institute of Electrical and Electronic Engineers (IEEE) 802.15.1 standard for WPANs, a BLUETOOTH® version 4.1 standard developed by the Bluetooth® Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the communication network 3. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a communication interface can include a destination identifier or address of a network device to which the data is to be transmitted. The data transmitted by a communication interface can include a source identifier or address of the system component including the communication interface. The source identifier or address can be used to send a response to the network device that includes the communication interface that sent the data.

A communication interface that is configured to carry out communications over the communication network 3, such as the communication interface 51, can include a modem, a network interface card, and/or a chip mountable on a circuit board. As an example the chip can comprise a CC3100 Wi-Fi® network processor available from Texas Instruments®, Dallas, Tex., a CC256MODx Bluetooth® Host Controller Interface (HCI) module available from Texas Instruments®, and/or a different chip for communicating via Wi-Fi®, Bluetooth® or another communication protocol.

Original OEM content 66 represents any of the types of vehicle service information described herein, including textual vehicle service information. Supplemented OEM content 67 represents OEM content that has been supplemented with one or more selectable vehicle scan tool initialization links. In some examples, original OEM content 66 may be processed to generate supplemented OEM content 67 at a point in time before the supplemented OEM content 67 is requested for display. In other examples, either original OEM content 66 or supplemented OEM content 67 or both may not be stored in memory 52. For instance, OEM content may be retrieved from an external database in response to a request from a display device, and the OEM content may be supplemented with selectable links on the fly before the supplemented OEM content is provided to the display device.

Memory 52 may also include one or more user profiles associated with user identifiers. The one or more user profiles may include technician profile 68 and/or shop profile 69. Technician profile 68 includes data describing vehicle scan tools associated with a technician identifier for a particular shop technician or other user. Shop profile 69 includes data describing vehicle scan tools associated with a particular vehicle repair shop or other facility. Technician profile 68 and/or shop profile 69 may store information about the service capabilities of different vehicle scan tools to allow for the selection of appropriate vehicle scan tools to perform vehicle service functions. Technician profile 68 and shop profile 69 may be arranged in a hierarchy such that shop profile 69 includes data describing vehicle scan tools for multiple different technicians. The hierarchy may also include additional tiers of profiles.

Figure 9:
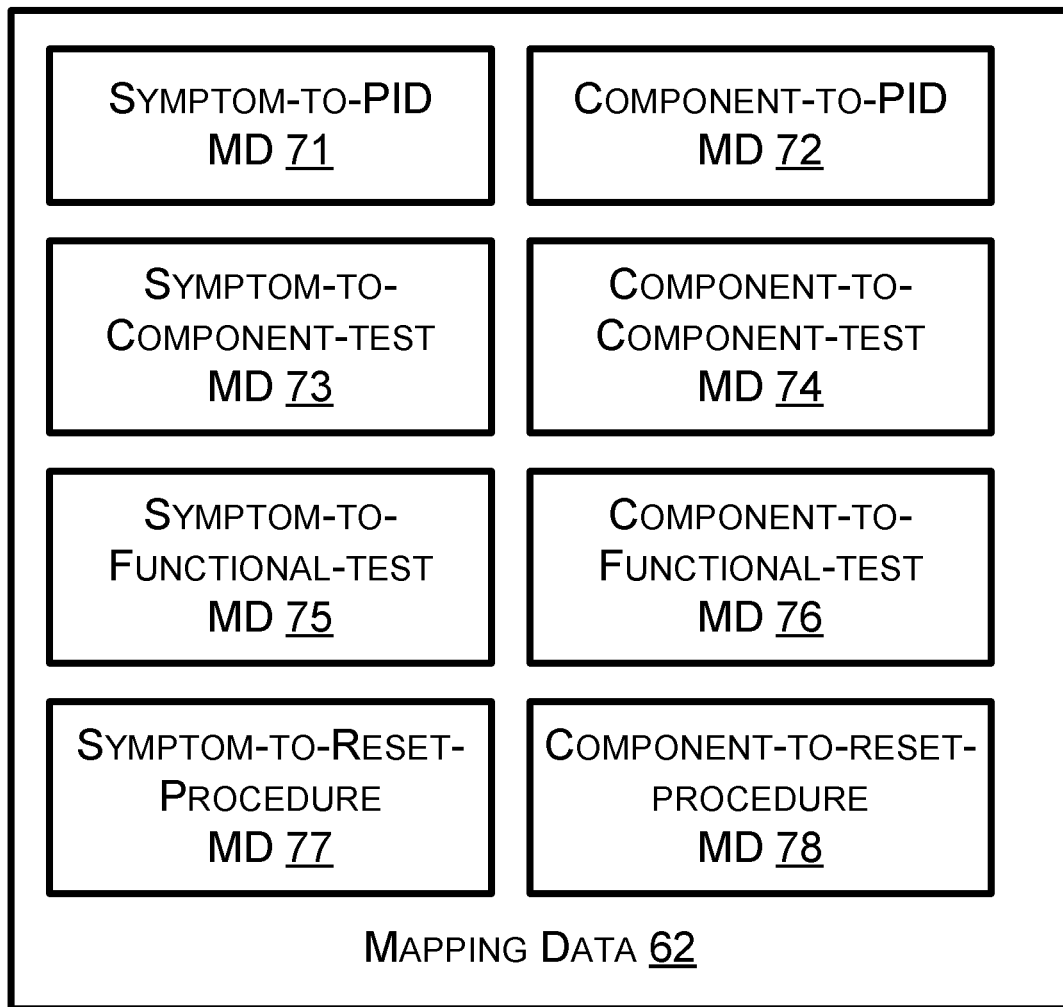
FIG. 9 is a diagram showing example mapping data in accordance with example embodiments.

Next, FIG. 9 shows examples of the mapping data 62. As shown, the mapping data 62 can comprise symptom-to-PID mapping data (MD) 71, component-to-PID MD 72, symptom-to-component-test MD 73, component-to-component-test MD 74, symptom-to-functional-test MD 75, component-to-functional-test MD 76, symptom-to-reset-procedure MD 77, and component-to-reset-procedure MD 78. More particular examples of the foregoing mapping data are discussed below.

In order to determine some or all of the mapping data 62, the server 2 may monitor the frequency of performance of functional tests, component tests, and/or reset procedures by one or more vehicle scan tools on vehicles having a particular vehicle identifier and at least one symptom identifier. In further examples, the server 2 may determine some or all of the mapping data 62 based on the probability of component failure of different associated components for vehicles having a particular vehicle identifier and at least one symptom identifier.

Figure 10:
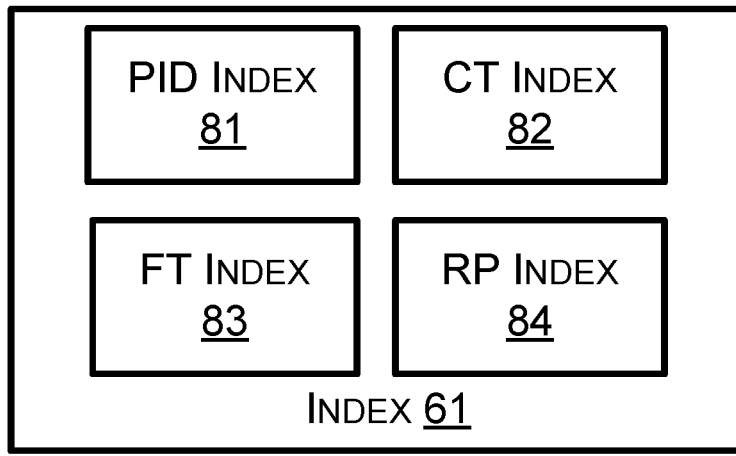
FIG. 10 is a diagram showing example indices in accordance with example embodiments.

Next, FIG. 10 shows examples of different indices that can be stored within the index 61. As shown, the index 61 can comprise a PID index 81, a component test index (CTI) 82, a functional test index (FTI) 83, and a reset procedure index (RPI) 84. Two or more of those indices can be combined and stored as a single index. More particular examples of the foregoing indices are discussed below. The server 2 may use any of the illustrated indices in order to communicate relevant scan tool functions to vehicle scan tool 4. In particular, in some examples, the server 2 may transmit index values to the vehicle scan tool 4 which identify the relevant scan tool functionality to configure the vehicle scan tool 4.

Figure 11:
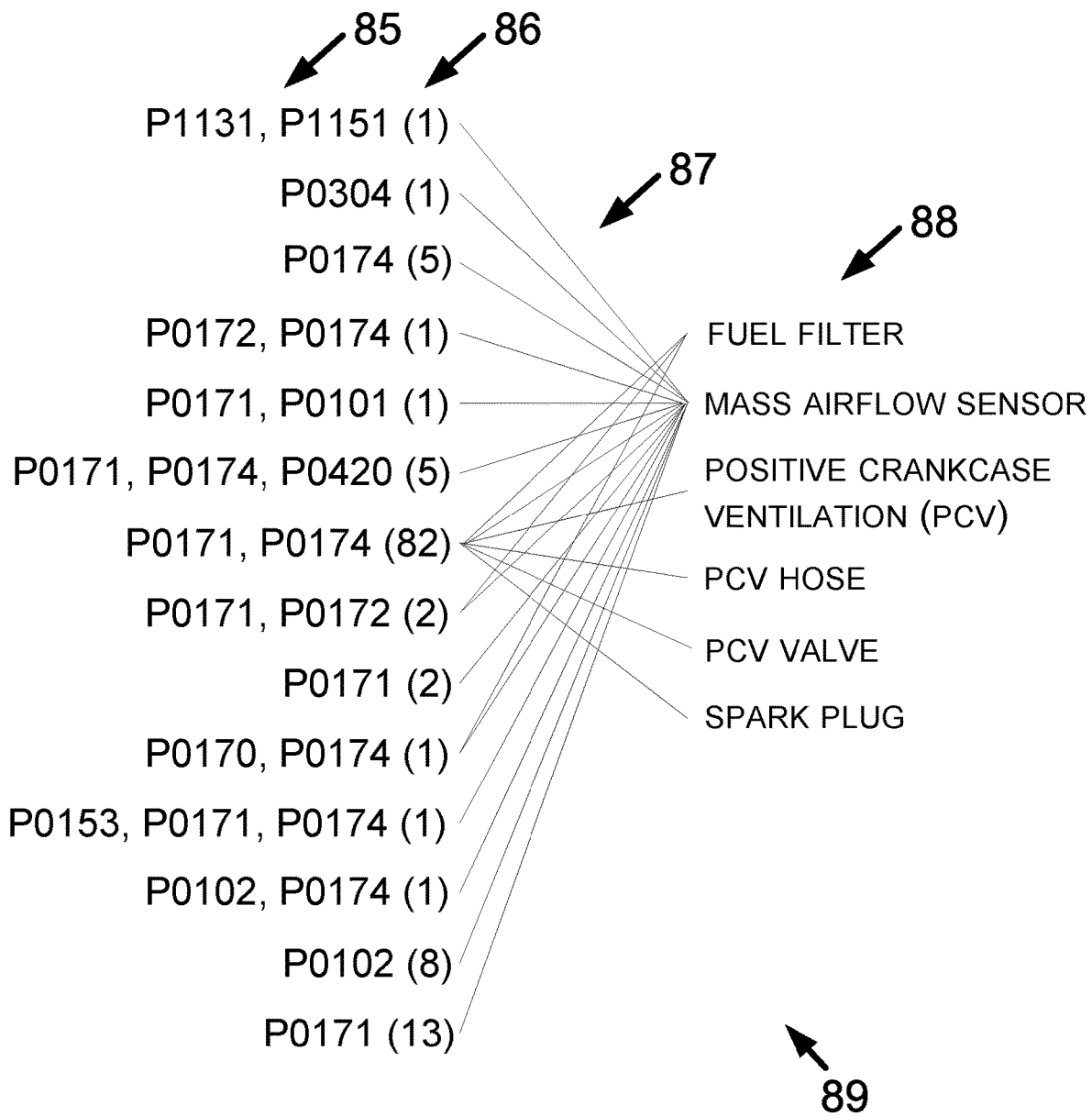
FIG. 11 is a diagram showing example symptom-to-component mapping data in accordance with example embodiments.

Next, FIG. 11 is a diagram showing example symptom-to-component mapping data 89 that can be stored in the mapping data 62. The symptoms 85 in FIG. 11 are shown as DTCs, but a mapped symptom can comprise a symptom other than a DTC. FIG. 11 shows a symptom count 86 within parenthesis for each symptom. The server 2 can determine the symptom counts 86 based on the RO data 63.

The DTCs shown in FIG. 11 can be referred to a "P-codes" from a powertrain controller ECU. As shown in FIG. 11, one symptom (such as the symptom P0171 and P0172) can be mapped to multiple components. The mapping between the symptom and component(s) 88 is represented in FIG. 11 by the mapping lines 87.

In further examples, vehicle symptoms may be identified by one or more non-DTC symptom identifiers (such as, "engine misfire," "misfire," or "engine no start," or "no start"). A non-DTC symptom identifier identifies a symptom other than by a DTC. In still other examples, symptoms may be identified by one or more DTCs and one or more non-DTC symptom identifiers. Moreover, any symptom discussed within this application (including any one or more symptoms and/or at least one symptom) may be identified by (i) one or more DTCs, (ii) one or more non-DTC symptom identifiers, and/or (iii) one or more DTCs and one or more non-DTC symptom identifiers.

Next, FIG. 12 shows additional examples of the mapping data 62. In particular, FIG. 12 shows examples of the symptom-to-PID MD 71 for four symptoms: symptom 1 is mapped to one PID, symptom 2 is mapped to one PID, symptom 3 is mapped to one PID, and symptom 4 is mapped to two PIDs. FIG. 12 also shows examples of the symptom-to-component-test MD 73 for four symptoms: symptom 1 is mapped to two component tests, symptom 2 is mapped to two component tests, symptom 3 is mapped to zero component tests, and symptom 4 is mapped to two component tests. FIG. 12 also shows examples of the symptom-to-functional-test MD 75 for four symptoms: symptom 1 is mapped to four functional tests, symptom 2 is mapped to four functional tests, symptom 3 is mapped to four functional tests, and symptom 4 is mapped to four functional tests. FIG. 12 also shows examples of the symptom-to-reset-procedure MD 77 for five symptoms: symptom 1 is mapped to one reset procedure, symptom 2 is mapped to one reset procedure, symptom 3 is mapped to zero reset procedures, symptom 4 is mapped to one reset procedure, and symptom 5 is mapped to two reset procedures. In FIG. 12, the example symptoms are shown in parenthesis and the PIDs, component tests, functional tests, and reset procedures are listed after the colons.

Next, FIG. 13 shows additional examples of the mapping data 62. In particular, FIG. 13 shows examples of the component-to-PID MD 72 for four components: component 1 is mapped to three PIDs, component 2 is mapped to three PIDs, component 3 is mapped to two PIDs, and component 4 is mapped to one PID. FIG. 13 also shows examples of the component-to-component-test MD 74 for five components: component 1 is mapped to two component tests, component 2 is mapped to three component tests, component 3 is mapped to three component tests, component 4 is mapped to two component tests, and component 5 is mapped to one component test. FIG. 13 also shows examples of the component-to-functional-test MD 76 for six components: component 1 is mapped to two functional tests, component 2 is mapped to zero functional tests, component 3 is mapped to two functional tests, component 4 is mapped to zero functional tests, component 5 is mapped to zero tests, and component 6 is mapped to one functional test. FIG. 13 also shows examples of the component-to-reset-procedure MD 78 for eight components: components 1, 2, 3, 4, 5, and 6 are each mapped to zero reset procedures, component 7 is mapped to two reset procedures, and component 8 is mapped to two reset procedures. In FIG. 13, the example components are shown in parenthesis and the PIDs, component tests, functional tests, and reset procedures are listed after the colons.

Next, FIG. 14 shows an example PID index 90. The PID index 90 comprises an ordered list of PIDs. FIG. 14 shows three example representations of PIDs within the PID index 90. As shown in FIG. 14, the PID index 90 can represent the PIDs using PID numbers 91, index values 92, and PID names 93 (i.e., at least one word describing a PID). A different PID index (for use with the example embodiments) may represent PIDs using only one of those three example representations, a combination of any two of those three example representations, or with a different example PID representation. The index values 92 can, for example, comprise decimal, hexadecimal, or numbers of some other base to represent the PIDs within the PID index 90. The PID index 81 (shown in FIG. 10) can comprise multiple PID indices, such as a separate PID index for each of multiple different set of particular identifying information (e.g., a separate PID index for each Y/M/M or Y). Those separate PID index can be arranged like the PID index 90 or in another manner. The PID index 90 can comprise or be associated with a particular vehicle identifier.

Next, FIG. 15 shows an example component test index (CTI) 95. A component test may be performable by an oscilloscope of the vehicle scan tool 4 or a multimeter of the vehicle scan tool 4. The CTI 95 comprises an ordered list of component tests. FIG. 15 shows three example representations of component tests within the CTI 95. As shown in FIG. 15, the CTI 95 can represent component tests using component test numbers 96, index values 97, and component test names 98 (i.e., at least one word describing a component test). A different CTI (for use with the example embodiments) may represent component tests using only one of those three example representations, a combination of any two of those three example representations, or with a different example component test representation. The index values 97 can, for example, comprise decimal, hexadecimal, or numbers of some other base to represent the component tests within the CTI 95. The CTI 82 (shown in FIG. 10) can comprise multiple component test indices, such as a separate CTI for each of multiple different set of particular identifying information (e.g., a separate CTI for each Y/M/M or Y Those separate CTI can be arranged like the CTI 95 or in another manner. The CTI 95 can comprise or be associated with a particular vehicle identifier.

Next, FIG. 16 shows an example functional test index (FTI) 101. The FTI 101 comprises an ordered list of functional tests. FIG. 16 shows three example representations of functional tests within the FTI 101. As shown in FIG. 16, the FTI 101 can represent functional test using functional test numbers 103, index values 105, and functional test names 107 (i.e., at least one word describing a functional test). A different FTI (for use with the example embodiments) may represent functional tests using only one of those three example representations, a combination of any two of those three example representations, or with a different example functional test representation. The index values 105 can, for example, comprise decimal, hexadecimal, or numbers of some other base to represent the functional tests within the FTI 101. The FTI 83 (shown in FIG. 10) can comprise multiple functional test indices, such as a separate FTI for each of multiple different set of particular identifying information (e.g., a separate FTI for each Y/M/M or Y/M/M/E). Those separate FTI can be arranged like the FTI 101 or in another manner. The FTI 101 can comprise or be associated with a particular vehicle identifier.

Next, FIG. 17 shows an example reset procedure index (RPI) 111. The RPI 111 comprises an ordered list of reset procedures. FIG. 17 shows three example representations of reset procedures within the RPI 111. As shown in FIG. 17, the RPI 111 can represent reset procedures using reset procedures numbers 113, index values 115, and reset procedures names 117 (i.e., at least one word describing a reset procedure). A different RPI (for use with the example embodiments) may represent reset procedures using only one of those three example representations, a combination of any two of those three example reset procedure representations, or with a different example reset procedure representation. The index values 115 can, for example, comprise decimal, hexadecimal, or numbers of some other base to represent the reset procedures within the RPI 111. The RPI 84 (shown in FIG. 10) can comprise multiple reset procedure indices, such as a separate RPI for each of multiple different set of particular identifying information (e.g., a separate RPI for each Y/M/M or Y Those separate RPI can be arranged like the RPI 111 or in another manner. The RPI 111 can comprise or be associated with a particular vehicle identifier. The index values 115 can be different than the index values of other indices (such as the PID index 90, the CTI 95, and the FTI 101) so that a single index using the index numbers of multiple indices can be formed without any overlap of the index numbers.

Next, FIG. 18 shows a particular example of the component hierarchy 65. The component hierarchy 65 can comprise a separate component hierarchy for each set of vehicles identifiable by a particular vehicle identifier. In an alternative arrangement, a separate component hierarchy can pertain to multiple sets of vehicles identifiable by different particular vehicle identifiers. In FIG. 18, the component hierarchy 65 pertains to a vehicle with a gasoline-powered engine having an electrical system, an exhaust system, a fuel system, and an intake system. FIG. 18 shows that a vehicle system can be subdivided into subsystems, as the electrical system is shown to include an ignition subsystem and charging subsystem.

Each indented line including a rectangular bullet point "□" lists a vehicle component that is part of an identified system or subsystem within a vehicle. Each vehicle component in the component hierarchy 65 can be associated with a PID, a component test, a functional test, and/or a reset procedure. Examples of the PID, component test, functional test, and/or reset procedure associated with the vehicle component are shown in FIG. 13. For instance, FIG. 18 shows an EGR valve is part of an exhaust system, and FIG. 13 shows the EGR valve is associated with PID13, PID14, PID24, CT1, CT4, FT13, and FT14. The component hierarchy 65 can include data (e.g., metadata) that indicates which PID, component test, functional test, and/or reset procedure associated with the vehicle component. The system and subsystem identifiers in the component hierarchy can also be associated with a PID, a component test, a functional test, and/or a reset procedure. That association to the system and subsystem can apply to all vehicle components within the system and subsystem, respectively. In some examples, a symptom-to-function mapping may be used to identify contextually relevant scan tool functions.

As an example, if a particular vehicle component referenced in OEM content is an oxygen sensor, the processor 50 can determine a contextually relevant PID, component test, functional test, and/or reset procedure to include in instructions sent to vehicle scan tool 4 by reference to the component hierarchy 65. The relevant PID, component test, functional test, and/or reset procedure can be related to a vehicle component within the same system or subsystem as the particular vehicle component or a vehicle component within a different system or subsystem. The vehicle components within each system and subsystem within the component hierarchy can be ordered so that the processor 50 can determine which vehicle component within the other system or subsystem are to be considered to determine whether the vehicle component is associated with a PID, component test, functional test, and/or reset procedure.

Figure 19:
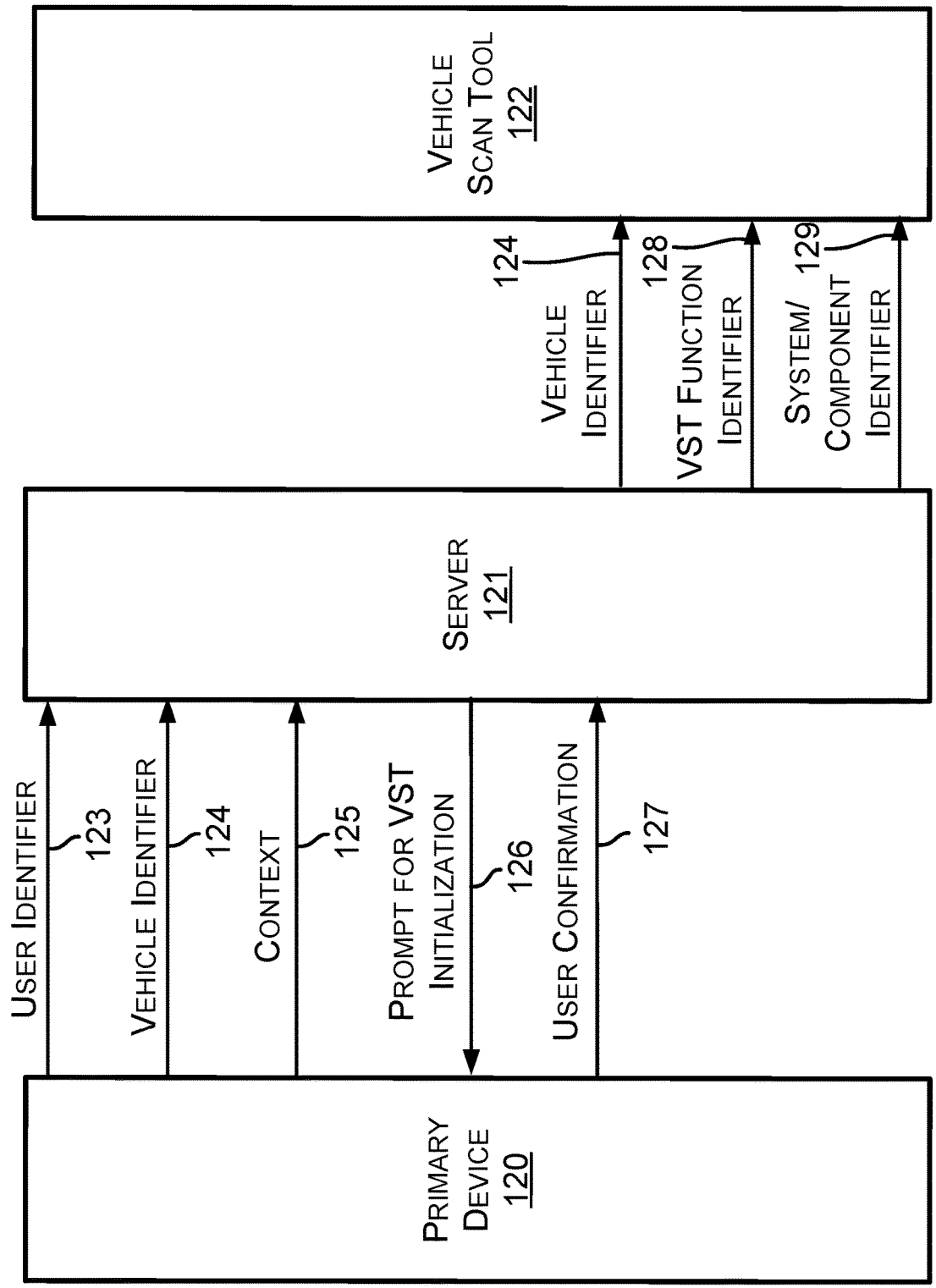
FIG. 19 is a communication flow diagram in accordance with example embodiments.

Next, FIG. 19 is a communication flow diagram in accordance with example embodiments. FIG. 19 illustrates an example workflow that results in automated initialization of a vehicle scan tool. FIG. 19 shows example communications that occur between primary device 120 and server 121. FIG. 19 further shows example communications that occur between server 121 and vehicle scan tool 122. The primary device 120 may be a computing device configured to display information to a technician, such as a computer work station, a tablet computer, a smartphone, a search device, a wheel alignment machine, a vehicle scan tool, or another piece of shop equipment. The vehicle scan tool 122 may be a computing device configured to communicate with a vehicle to send data to and/or receive data from the vehicle to cause the performance of one or more vehicle service functions.

The communications may include the primary device 120 sending a user identifier 123 (e.g., a technician identifier and/or a shop identifier), a vehicle identifier 124, and contextual information 125 to the server 121. The user identifier 123 may be a numerical identifier, a textual identifier, or some other form of identifier. The user identifier 123 may be determined based on a technician being logged in to a software application running on primary device 120. The vehicle identifier 124 may identify a vehicle to be serviced at a repair shop. The vehicle identifier 124 may include a year, make, model, and engine of the vehicle, or a different set of identifying information. The vehicle identifier 124 may be in a Department of Motor Vehicles (DMV) format or a different format. In further examples, the vehicle identifier 124 may include a vehicle identification number (VIN), an associated repair order identifier, and/or a license plate number as well or instead. The contextual information 125 may be OEM content or a different type of textual and/or non-textual vehicle service information displayed on the primary device 120.

The communications may further include server 121 sending instructions to cause a prompt 126 to be displayed on primary device 120 to automatically configure a vehicle scan tool to perform a contextually relevant scan tool function. The server 121 may determine the contextually relevant scan tool function based on contextual information 125 for a vehicle described by vehicle identifier 124 and for a scan tool associated with user identifier 123. In some examples, the prompt 126 may be a selectable link that is activated and displayed within OEM content that is displayed on a display interface of primary device 120. In other examples, the prompt 126 may be presented as a yes/no question or in a different format.

The communications may additionally include primary device 120 sending a user confirmation signal 127 to server 121. The user confirmation signal 127 may be sent in response to a user input provided at primary device 120. The user input may indicate a technician's consent to automatically initialize a vehicle scan tool to perform a contextually relevant vehicle scan tool function. The user input may take the form of a click, a button press, an audio input, or a different type of confirmation input. In some examples, the user input may further involve a selection of a scan tool from a list of scan tools and/or a selection of a scan tool function from a list of scan tool functions.

The communications may further include server 121 sending data describing the vehicle identifier 124, a vehicle scan tool function identifier 128, and a vehicle system and/or component identifier 129 to the vehicle scan tool 122. In particular, in response to receiving the user confirmation signal 127 from primary device 120, server 121 may provide a set of instructions to configure vehicle scan tool 122 to perform a contextually relevant scan tool function. The instructions may include the vehicle identifier 124, which may be converted to a different format by server 121 before transmission to vehicle scan tool 122. The instructions may further include vehicle scan tool function identifier 128, which may identify the vehicle scan tool function by name, identification number, index value into a list of functions, and/or in a different manner. The instructions may further include system and/or component identifier 129, which is a name or other descriptor for the vehicle system and/or component in which the scan tool function resides. The instructions may cause the vehicle scan tool 122 to be initialized so that the scan tool function will be performed on a vehicle in response to a single input from the technician supplied at the vehicle scan tool. In some examples, this input may instead be provided by the technician at primary device 120 or at a different computing device.

The contextual information 125 may also include timing information indicating that a particular step of a plurality of steps of a vehicle service procedure has been completed. The server 121 may then determine the vehicle scan tool function as a function to be performed on the vehicle subsequent to the particular step. The server 121 may also receive an indication from the vehicle scan tool 122 that performance of the vehicle scan tool function on the vehicle is complete. In response, the server 121 may provide instructions to the primary device 120 to display a subsequent step of the plurality of steps, where the subsequent step comes after the particular step in performance of the vehicle service procedure.

In further examples, the primary device 120 may include a video camera. For instance, the primary device 120 may be configured to display an augmented reality presentation. In such examples, the contextual information 125 provided to the server 121 by the primary device 120 may include a portion of the vehicle currently viewed by the video camera. Based on which portion of the vehicle is currently being viewed by a technician, relevant scan tool functionality may be overlaid at corresponding locations in the augmented reality presentation.

Figure 20:
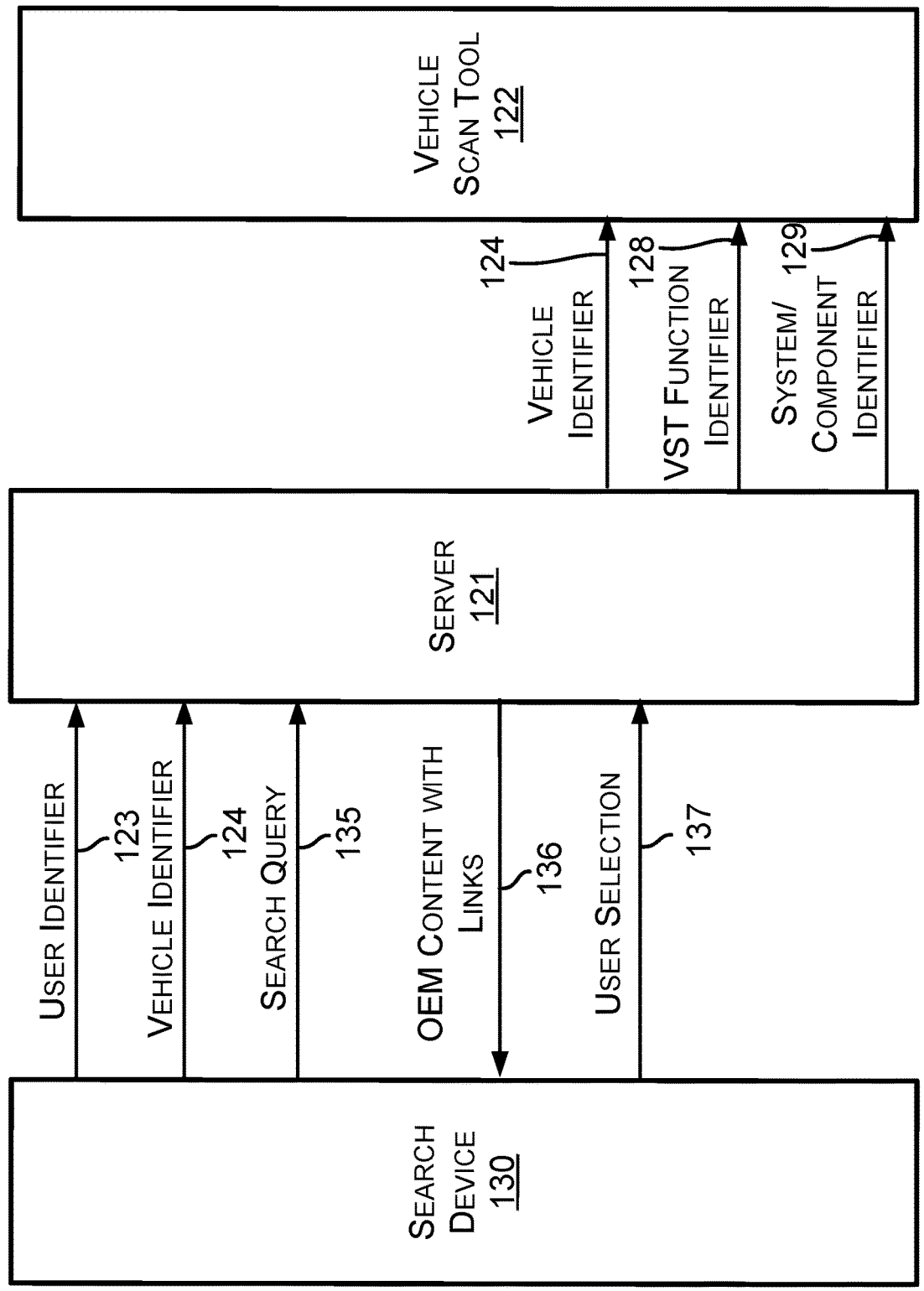
FIG. 20 is another communication flow diagram in accordance with example embodiments.

Next, FIG. 20 is another communication flow diagram in accordance with example embodiments. FIG. 20 illustrates an example workflow that results in automated initialization of a vehicle scan tool after user input at a search device. FIG. 20 shows example communications that occur between search device 130 and server 121. Search device 130 may be an example of primary device 120 shown in FIG. 19. FIG. 20 further shows example communications that occur between server 121 and vehicle scan tool 122.

The communications may include the search device 130 sending a user identifier 123, a vehicle identifier 124, and a search query 135. The search query 135 may indicate a vehicle symptom, such as a DTC or a textual description of a vehicle symptom. In other examples, the search query 135 may be a keyword search that does not specifically identify a vehicle symptom. Based on the search query 135, server 121 may provide OEM content 136 with selectable links for display on search device 130. The selectable links may allow for the automatic initialization of a vehicle scan tool to perform vehicle scan tool functions that are contextually relevant to corresponding portions of the OEM content 136. In some examples, the selectable links may have been added to the OEM content at a previous point in time. In other examples, the selectable links may be added to the OEM content in response to receiving the search query 135. In either case, the appearance of the selectable links may be modified based on scan tool availability for the technician and/or shop identified by user identifier 123. The communications may further include a user selection 137 of a selectable link in the OEM content. Selection of the link will trigger automated initialization of a vehicle scan tool to perform a contextually relevant scan tool function.

The communications may additionally include server 121 sending data describing the vehicle identifier 124, a vehicle scan tool function identifier 128, and a vehicle system and/or component identifier 129 to the vehicle scan tool 122. In FIG. 20, the scan tool function identified by vehicle scan tool function identifier 128 may relate to the OEM content 136 displayed on search device 130 in response to search query 135 inputted by a technician at search device 130.

Figure 21:
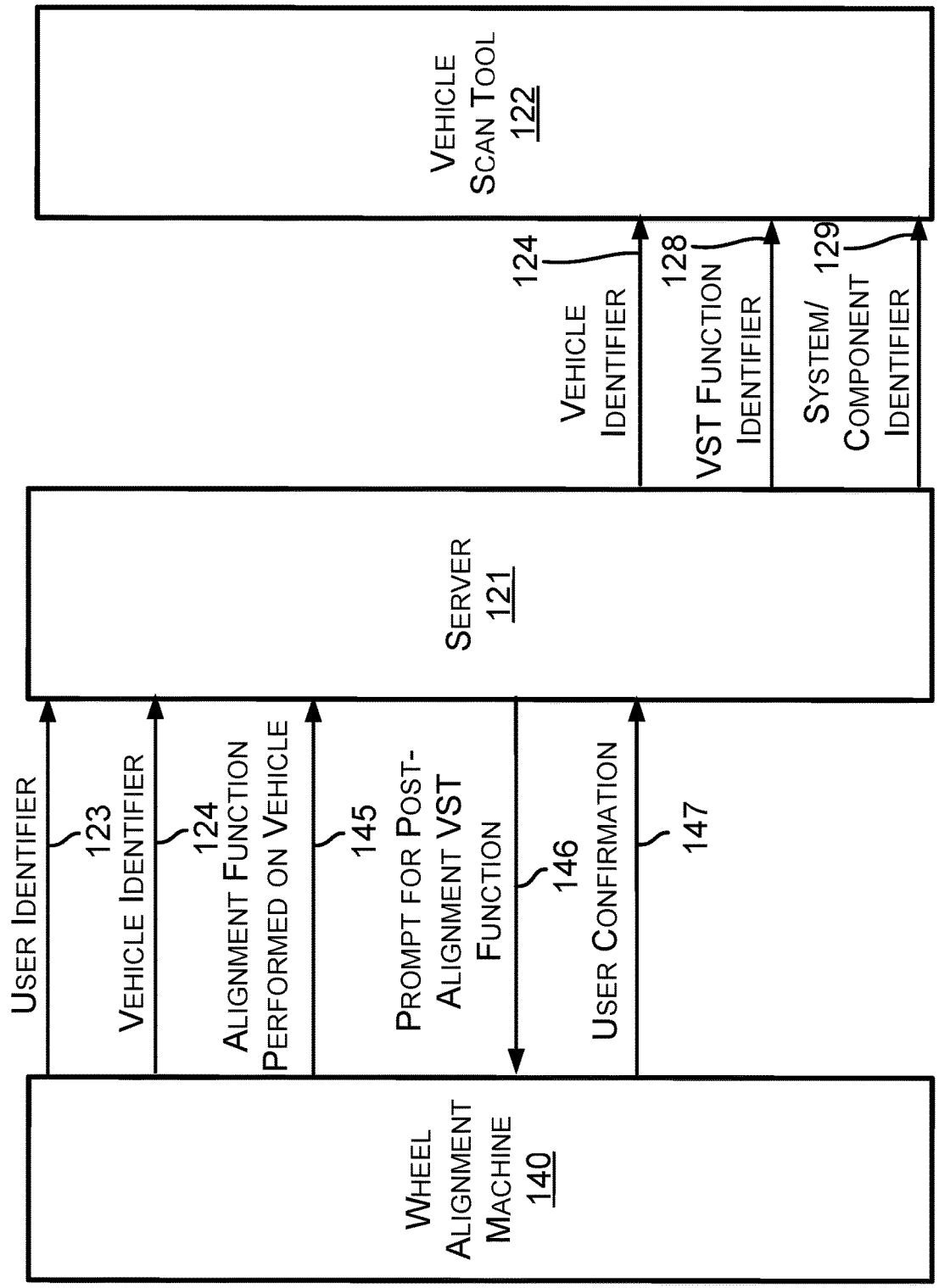
FIG. 21 is an additional communication flow diagram in accordance with example embodiments.

Next, FIG. 21 is an additional communication flow diagram in accordance with example embodiments. FIG. 21 illustrates an example workflow that results in automated initialization of a vehicle scan tool after user input at a wheel alignment machine. FIG. 21 shows example communications that occur between wheel alignment machine 140 and server 121. Wheel alignment machine 140 may be an example of primary device 120 shown in FIG. 19. FIG. 21 further shows example communications that occur between server 121 and vehicle scan tool 122.

The communications may include the wheel alignment machine 140 sending a user identifier 123, a vehicle identifier 124, and an indication of an alignment function 145 performed on the vehicle by the wheel alignment machine 140. In some examples, the alignment function 145 may be a step of a vehicle service procedure. Based on the alignment function 145, server 121 may cause a prompt 146 to be displayed on wheel alignment machine 140 offering to initialize a vehicle scan tool to perform a post-alignment scan tool function. The scan tool function may be a reset procedure. As an example, four wheel alignment may be performed on a 2018 Ford® Mustang® using the wheel alignment machine. For this vehicle, the scan tool function may be a crash avoidance radar calibration or a steering angle sensor reset, each of which may be determined to be appropriate scan tool functions to perform after the alignment function 145. The communications may further include a user confirmation 147 to initialize a vehicle scan tool to perform the post-alignment vehicle scan tool function. The user confirmation 147 will trigger automated initialization of a vehicle scan tool to perform the post-alignment vehicle scan tool function.

The communications may additionally include server 121 sending data describing the vehicle identifier 124, a vehicle scan tool function identifier 128, and a vehicle system and/or component identifier 129 to the vehicle scan tool 122. In FIG. 21, the scan tool function identified by vehicle scan tool function identifier 128 may be a scan tool function determined to be an appropriate scan tool function after a wheel alignment function performed on the vehicle by wheel alignment machine 140.

In further examples, a sequence of vehicle scan tool functions may be presented at the wheel alignment machine 140 during the performance of an alignment procedure. For instance, before the wheel alignment is started by a technician, an option may be presented at the wheel alignment machine 140 to configure the vehicle scan tool 122 to check the tire pressure on the vehicle. Subsequently, another option may be presented at the wheel alignment machine 140 to set up the vehicle scan tool 122 to put the vehicle into neutral adjustment or alignment mode. After the technician starts alignment, an additional option may be presented at the wheel alignment machine 140 to set up the vehicle scan tool 122 to lock the steering wheel and set the wheel angles to neutral. More generally, a sequence of vehicle scan tool initialization options may be presented at appropriate times during the performance of a vehicle service procedure at a wheel alignment machine or some other piece of shop equipment. The server 121 may also monitor the completion of scan tool functions, and send messages to the wheel alignment machine or other piece of shop equipment to proceed with subsequent steps of a vehicle service procedure at appropriate times.

Next, FIG. 22 shows a flowchart depicting a set of functions 150 (or more simply "the set 150") that can be carried out in accordance with the example embodiments described in this description. The set 150 includes the functions shown in blocks labeled with whole numbers 151 through 156 inclusive. The following description of the set 150 includes references to elements shown in other figures described in this description, but the functions of the set 150 are not limited to being carried out only by the referenced elements. A variety of methods can be performed using all of the functions shown in the set 150 or any proper subset of the functions shown in the set 150. Any of those methods can be performed with other functions such as one or more of the other functions described in this description, including any of the functions of the set 40 illustrated in FIG. 7. In some examples, the set 150 may be carried out by a server, such as server 2 of FIG. 1. In further examples, some or all of the set 150 may be carried out by a different device, such as primary device 10 of FIG. 1.

Block 151 includes receiving, from a computing device, (i) a user identifier, (ii) a vehicle identifier for a vehicle, and (iii) contextual information related to vehicle service content currently displayed on the computing device. The computing device may be any of the primary devices described herein, including a computer workstation, a tablet computer, a smartphone, a search device, a wheel alignment machine, a vehicle scan tool, or another piece of shop equipment. The user identifier may be a technician identifier and/or shop identifier received based on session information at the computing device identifying a technician that is currently logged in, or the user identifier may be received in some other manner. The vehicle identifier may be received based on user input at the computing device, located from a repair order, or the vehicle identifier may be received in some other manner. The contextual information may be any of the types of OEM content and other types of vehicle service content described herein, including textual and/or non-contextual content, a step or steps of a vehicle service procedure, and/or a search query entered at the computing device.

Next, block 152 includes based on the contextual information, determining a vehicle scan tool function to perform on the vehicle. More specifically, the vehicle scan tool function may be a vehicle service function that is contextually relevant to the vehicle service content displayed on the computing device. The vehicle scan tool function may be determined using any of the methods of identifying relevant scan tool functionality described herein, including using one or more mappings, a vehicle component hierarchy, and/or service procedure timeline information. In some cases, determining the vehicle scan tool function may involve retrieving a scan tool function previously determined to be contextually relevant to the vehicle service content displayed on the computing device.

Next, block 153 includes identifying a vehicle scan tool associated with the user identifier. The vehicle scan tool may be configured to display at least one navigable menu to select from a plurality of vehicle scan tool functions and to select from a plurality of vehicle identifiers. At least the determined vehicle scan tool function may be included in the plurality of vehicle scan tool functions. At least the received vehicle identifier may be included in the plurality of vehicle identifiers. Identifying the vehicle scan tool capable of performing the relevant scan tool function on the particular vehicle may involve referencing a user profile (e.g., a technician profile and/or a shop profile) describing available vehicle scan tools and corresponding scan tool capabilities.

Next, block 154 includes causing a selectable vehicle scan tool initialization option to be displayed on the computing device. In some examples, the selectable vehicle scan tool initialization option may be a selectable link inserted into OEM content which is displayed on the computing device. In other examples, the selectable vehicle scan tool initialization option may take the form of a yes/no question, a list of available vehicle scan tool functions, or a different type of prompt.

Next, block 155 includes receiving, from the computing device, a selection of the selectable vehicle scan tool initialization option. The selection may involve a touchscreen press, a button press, a mouse click, a voice input, or a different type of user confirmation. In some examples, the selection may additionally require a selection of a vehicle scan tool from a list of available scan tools capable of performing the relevant scan tool functionality on the particular vehicle.

Next, block 156 includes in response to receiving the selection, providing instructions to initialize the vehicle scan tool to perform the vehicle scan tool function on the vehicle. The instructions may include at least the vehicle identifier and an identifier for the vehicle scan tool function. The instructions may additionally include an identifier for a component and/or system to which the vehicle scan tool function relates. In further examples, the instructions may also include other types of data. In particular, if there are configuration parameters in OEM content such as numerical values, these parameters may be identified by the server and passed down to the scan tool so that the technician does not need to manually enter the parameters. By providing instructions to automatically initialize the vehicle scan tool to perform the contextually relevant functionality, manual navigation through the at least one navigable menu on the vehicle scan tool may be avoided. In some examples, the instructions may configure the vehicle scan tool so that only a single user input (e.g., one click at the vehicle scan tool) is required to initialize performance of the vehicle scan tool function on the particular vehicle.

In further examples, a scan tool may provide a response indicating the status of scan tool functionality being performed. This response, or feedback data, may be received by the server and sent back to the primary device. The primary device may display this feedback data (e.g., within OEM content). The feedback data may also be tied to a repair order, which may be helpful in case a vehicle is brought back into the repair shop so that a technician can see how a vehicle part was reset and/or activated.

Figure 23:
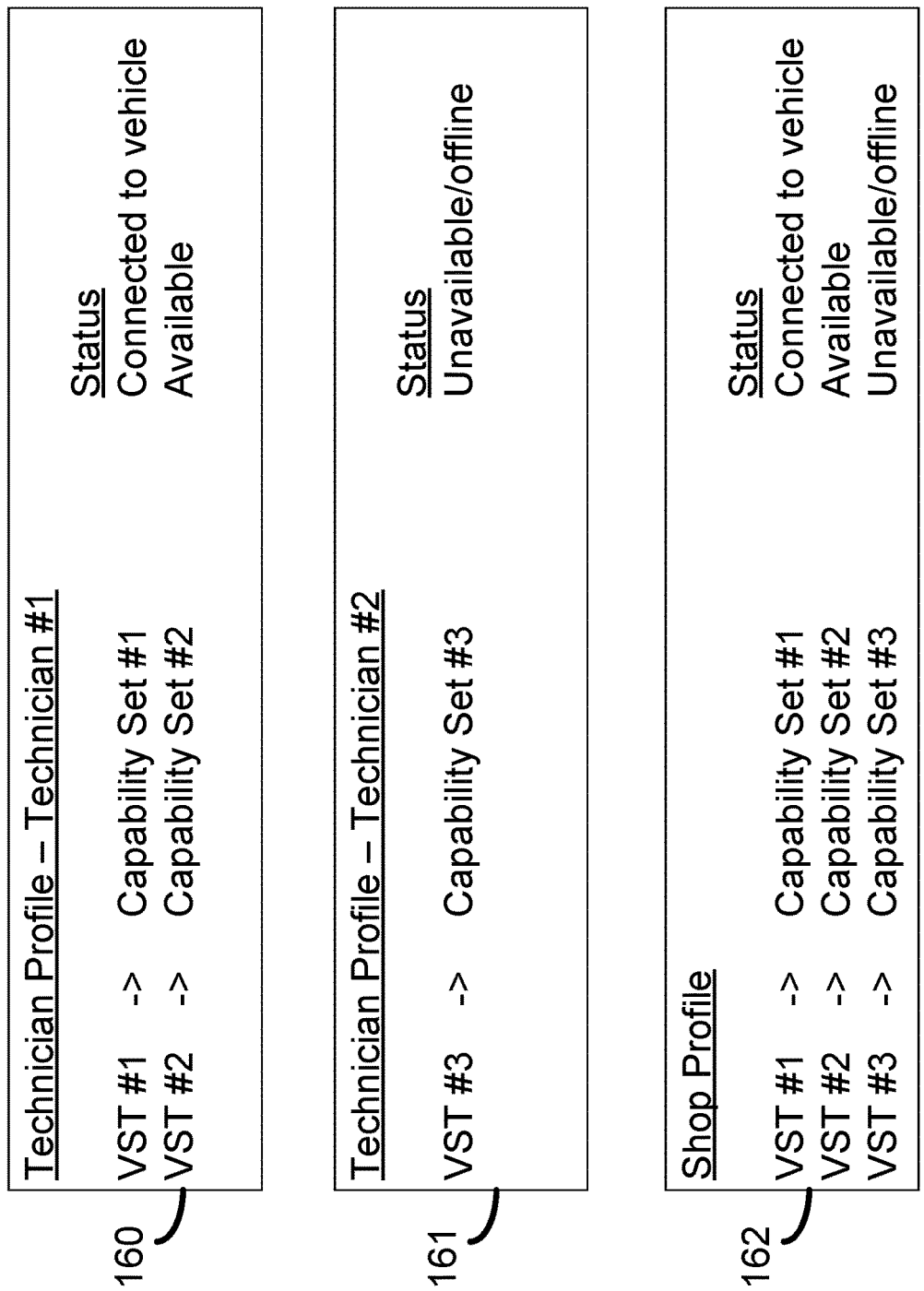
FIG. 23 illustrates example user profiles.

Next, FIG. 23 illustrates example user profiles. A server may store or otherwise have access to one or more user profiles (e.g., technician profiles and/or shop profiles) describing previously registered vehicle scan tools in order to identify scan tools capable of performing contextually relevant scan tool functionality. FIG. 23 illustrates a first technician profile 160 for a first technician, a second technician profile 161 for a second technician, and a shop profile 162. Each user profile may be associated with a user identifier (e.g., a technician identifier and/or a shop identifier).

The first technician profile 160 includes two vehicle scan tools (VST #1 and VST #2) and a corresponding capability set for each scan tool. The capability set indicates the set of scan tool functions performable by the corresponding scan tool. The capabilities of a scan tool may vary based on vehicle type and/or other factors. The first technician profile 160 additionally includes a status of each of the two vehicle scan tools. The status of VST #1 indicates that the first scan tool is currently connected to a vehicle, and identifying information for the vehicle may also be stored. The status of VST #2 indicates that the second scan tool is available (e.g., not connected to a vehicle). In some embodiments, when searching for a scan tool to automatically initialize, a server may first search for a scan tool that is already connected to the particular vehicle. If no capable scan tool is connected to the vehicle, an available scan tool may instead be selected. A scan tool that is currently connected to a different vehicle may not be a preferred choice. However, the scan tool may be configured with a queuing mechanism that allows the scan tool to receive and save initialization instructions when connected to a different vehicle. Once the scan tool becomes available or becomes connected to the vehicle to which the instructions relate, the scan tool may then recall the instructions to automatically configure to perform the relevant scan tool functionality.

Within example embodiments, the server may send a beacon signal (e.g., a wireless communication) to a vehicle scan tool to attempt to establish communication with the scan tool before causing a scan tool initialization option to be displayed on a primary device. In some examples, the beacon signal may cause the scan tool to switch from a manual mode to an automatic mode. The automatic mode may be one in which a vehicle scan tool function is performed by the vehicle scan tool in response to a single user confirmation input signal entered at the vehicle scan tool.

The second technician profile 161 includes one vehicle scan tool (VST #3) and a corresponding capability set for the scan tool. The second technician profile 161 also indicates that VST #3 currently has a status of unavailable/offline. A server may be configured to not present a scan tool initialization option for an unavailable scan tool. For instance, if no scan tool capable of performing the relevant scan tool functionality is available, a selectable link in OEM content may be deactivated. In some examples, when a technician profile contains no available scan tool capable of performing the relevant scan tool functionality, a shop profile may then be searched for a scan tool.

The shop profile 162 in this case includes each of the three vehicle scan tools (VST #1, VST #2, and VST #3), and a corresponding capability set and status for each scan tool. Any technicians at the shop may be able to use scan tools from the shop profile 162. For instance, if technician #2 needs a vehicle scan tool to perform a contextually relevant scan tool function, a server may send initialization instructions to VST #1 or VST #2. The server may also notify the technician of the scan tool that has been initialized (e.g., by identifying the scan tool in the OEM content displayed to the technician). In general, a technician could be a member of multiple groups of a shop hierarchy. The shop hierarchy may be searched by a server to find appropriate vehicle scan tools to activate and/or initialize.

Figure 24:
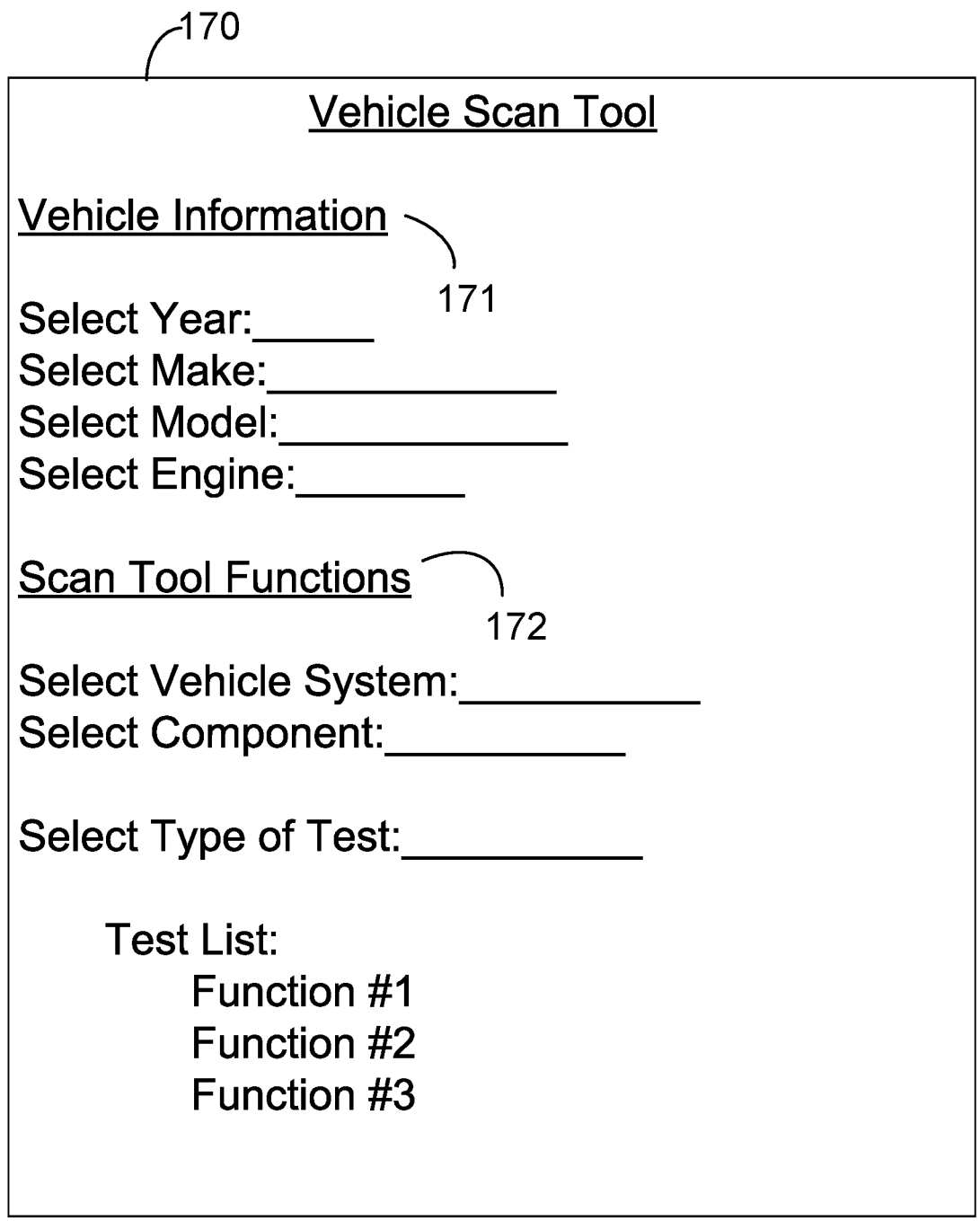
FIG. 24 is an example menu configuration of a vehicle scan tool.

Next, FIG. 24 is an example menu configuration of a vehicle scan tool. The vehicle scan tool may include a display interface 170 that allows for user configuration of vehicle service functions. In order to configure the scan tool, a technician may be required to navigate through one or more navigable menus. The navigable menus may allow for user configuration of vehicle information 171, which may include a year, make, model, and engine of a vehicle. Each piece of vehicle information 171 may require a technician to separately select an input value from a list or a different type of input mechanism. Further the navigable menus may additionally allow for user configuration of scan tool functions 172. In some examples, this configuration may first require a selection of a relevant vehicle system and/or component. Additionally, a separate selection may be required to identify the type of test (e.g., functional test, component test, reset procedure) before being provided with a test list from which an individual test may be selected. It should be understood that the vehicle scan tool may take on a wide variety of different configurations and/or appearances that may require extensive user navigation to configure the scan tool to perform a relevant scan tool function. Automated vehicle scan tool initialization may avoid these user navigation steps by configuring the scan tool to automatically navigate through the menus to a contextually relevant scan tool function.

Next, FIG. 25 shows a flowchart depicting a set of functions 180 (or more simply "the set 180") that can be carried out in accordance with the example embodiments described in this description. The set 180 includes the functions shown in blocks labeled with whole numbers 181 through 184 inclusive. The following description of the set 180 includes references to elements shown in other figures described in this description, but the functions of the set 180 are not limited to being carried out only by the referenced elements. A variety of methods can be performed using all of the functions shown in the set 180 or any proper subset of the functions shown in the set 180. Any of those methods can be performed with other functions such as one or more of the other functions described in this description. In some examples, the set 180 may be carried out by a vehicle scan tool, such as vehicle scan tool 4 of FIG. 1. In further examples, some or all of the set 150 may be carried out by a different device, such as server 2 of FIG. 1.

Block 181 includes receiving, at a vehicle scan tool, a request for automated vehicle scan tool initialization. The request includes a function identifier for a vehicle scan tool function and a vehicle identifier for a vehicle. The request may also include additional information, such as a vehicle system and/or component identifier. The vehicle scan tool is configured to display at least one navigable menu that allows for selection from a plurality of vehicle scan tool functions, including at least the vehicle scan tool function. The at least one navigable menu also allows for selection from a plurality of vehicle identifiers, including at least the vehicle identifier.

In some examples, the request may be received by the vehicle scan tool from a server, such as server 2 of FIG. 1. In some of these examples, the vehicle scan tool may continuously monitor for automated vehicle scan tool initialization requests pushed from the server. In others of these examples, the vehicle scan tool may periodically attempt to pull automated vehicle scan tool initialization requests from the server. In further examples, before receiving the request for automated vehicle scan tool initialization, the vehicle scan tool may receive a beacon signal from the server. In response to the beacon signal, the vehicle scan tool may send to the server a status flag indicative of whether or not the vehicle scan tool is currently performing any vehicle scan tool function. The response from the vehicle scan tool to the beacon signal may allow the server to select the vehicle scan tool (e.g., from a plurality of available vehicle scan tools) to receive the request for automated vehicle scan tool initialization.

The vehicle identifier may be a year, make, model, and engine (YMME), or any other type of vehicle identifier described herein. In some examples, the vehicle scan tool function may be a functional test in which the vehicle scan tool transmits a message to an electronic control unit in the vehicle to perform the functional test on the vehicle with the vehicle scan tool. In other examples, the vehicle scan tool function may involve retrieving a list of relevant parameter identifier values (PIDs) from the vehicle for display on the vehicle scan tool. Other types of vehicle scan tool functions are also contemplated.

Next, bock 182 includes determining a current operating state of the vehicle scan tool. The current operating state is one of a plurality of possible operating states of the vehicle scan tool, and may be used by the vehicle scan tool to determine how and when to act on an automated vehicle scan tool initialization request. The operating states may also be used by the vehicle scan tool to determine how to customize messaging to a technician. Example vehicle scan tool operating states include: (i) off, (ii) on but not connected to a vehicle, (iii) connected to a vehicle but not actively performing any vehicle scan tool function, and (iv) performing a vehicle scan tool function on a vehicle. Other operating states are also possible. Each operating state may be associated with one or more rules for acting on vehicle scan tool initialization requests.

In some examples, determining the current operating state of the vehicle scan tool may involve determining that the vehicle scan tool is not connected to any vehicle. In some implementations, the vehicle scan tool may automatically act on a vehicle scan tool initialization request when in this operating state. In some examples, the vehicle scan tool may also display a message indicating that the technician should connect the vehicle scan tool to the appropriate vehicle for the requested vehicle scan tool function. In alternative implementations, the vehicle scan tool may not act on a vehicle scan tool initialization request when in this operating state until the vehicle scan tool determines that it has been connected to the appropriate vehicle.

In further examples, determining the current operating state of the vehicle scan tool may involve determining that the vehicle scan tool is already connected to the vehicle to which the vehicle scan tool initialization request relates, and that the vehicle scan tool is not currently performing any vehicle scan tool function on the vehicle. In this operating state, the vehicle scan tool may automatically act on the initialization request to initialize the vehicle scan tool to perform the requested function on the vehicle.

In additional examples, determining the current operating state of the vehicle scan tool may involve determining that the vehicle scan tool is already connected to the vehicle to which the initialization request relates, but that the vehicle scan tool is currently performing a different vehicle scan tool function on the vehicle. In this operating state, the vehicle scan tool may display an option to interrupt the different vehicle scan tool function. The vehicle scan tool may only initialize itself to perform the requested scan tool function after receiving a user input indicating to interrupt the different vehicle scan tool function. In further examples, the vehicle scan tool may only initialize itself to perform the requested scan tool function after detecting that the different vehicle scan tool function has been completed.

Next, block 183 includes making a determination to initialize the vehicle scan tool according to the request for automated vehicle scan tool initialization. This determination may be made based on the determined current operating state of the vehicle scan tool. In some examples, this determination to act on a vehicle scan tool initialization request may be made immediately after receiving the request. In other examples, the determination to act on the vehicle scan tool initialization request may not be made until a later point in time. In some examples, this determination may be made by the vehicle scan tool without additional communication with a server. In alternative examples, this determination may be made with the assistance of a server. For instance, the vehicle scan tool may provide information about its current operating state to the server, and the server may respond to indicate when the vehicle scan tool may act on a vehicle scan tool initialization request.

Regardless of the level of involvement of the server in making this determination, the vehicle scan tool may be configured to verify that it is not connected to the wrong vehicle before acting on a vehicle scan tool initialization request. For instance, the vehicle scan tool may determine that the vehicle scan tool is initially connected to a different vehicle than the one to which the vehicle scan tool initialization request relates. In response to determining that the vehicle scan tool is initially connected to the different vehicle, the vehicle scan tool may store the request for automated vehicle scan tool initialization. The vehicle scan tool may then be configured to make the determination to initialize itself according to the request for automated vehicle scan tool initialization after determining that the vehicle scan tool has been disconnected from the different vehicle and that the vehicle scan tool has been connected to the vehicle to which the request pertains.

Next, block 184 includes in response to making the determination to initialize the vehicle scan tool, using the function identifier and the vehicle identifier to initialize the vehicle scan tool to perform the vehicle scan tool function on the vehicle. In some examples, the vehicle scan tool may be switched from a manual mode in which the at least one navigable menu is manually navigable through user input to an automatic mode in which the vehicle scan tool function is performed by the vehicle scan tool on the vehicle in response to a single user input signal (e.g., a single click). An option to initiate the function may be presented as a yes/no question, or in a different format. If a user confirmation to perform the vehicle scan tool function on the vehicle is received, a message may be transmitted from the vehicle scan tool to an electronic control unit in the vehicle in order to perform the vehicle scan tool function on the vehicle with the vehicle scan tool.

In some examples, the option to initiate the vehicle scan tool function may be displayed on the vehicle scan tool itself. In further examples, the option may be displayed on a different computing device as well or instead, such as the requesting device or a different computing device that is wirelessly connected with the vehicle scan tool. For instance, from an alignment machine, a technician may be provided with an option to cause the vehicle scan tool to check the tire pressure on a vehicle. For functions where there is not a safety concern, it may not be required for the technician to provide a confirmation signal on the vehicle scan tool itself. Other functions which require actuation in the vehicle may require technician confirmation at the vehicle scan tool itself. The safety logic to determine where user confirmation must be provided from or whether user confirmation is required at all in order to initialize the vehicle scan tool may generally be maintained by a server that communicates with both the vehicle scan tool and a requesting device.

In further examples, the display interface of the vehicle scan tool may be configured to provide a technician with an intuitive understanding of which navigation steps were traversed through the automated scan tool initialization process. In particular, the vehicle scan tool may display a cookie crumb trail indicative of which navigable menus were bypassed by using a function identifier and a vehicle identifier (and possibly other information) contained in the automated initialization request in order to initialize the vehicle scan tool.

Figure 26:
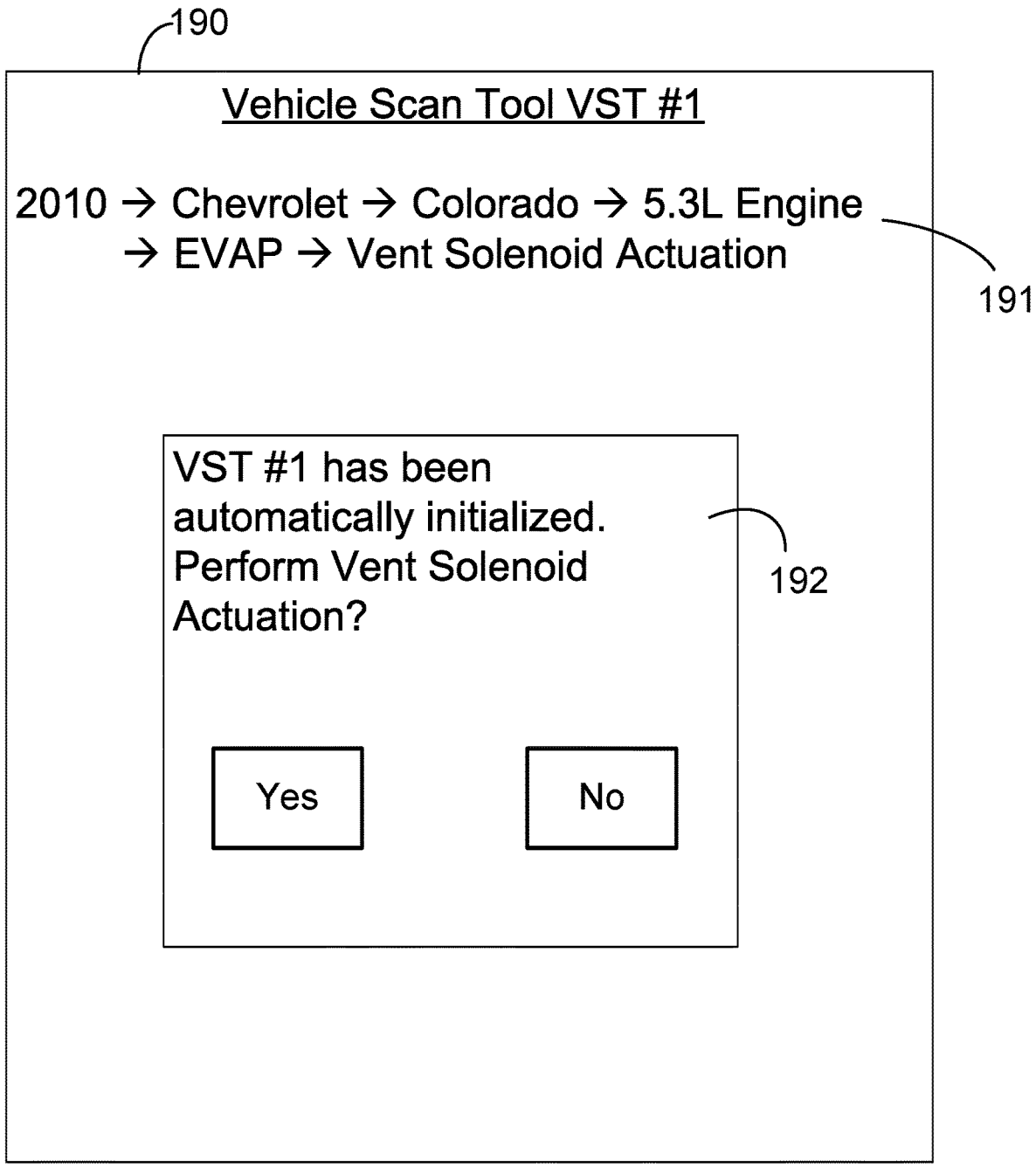
FIG. 26 is an illustration of an initialized vehicle scan tool, in accordance with the example embodiments.

Next, FIG. 26 is an illustration of an initialized vehicle scan tool, in accordance with the example embodiments. More specifically, a vehicle scan tool (VST #1) may have been initialized after receiving an automated vehicle scan tool initialization request from a server. A display interface 190 of the vehicle scan tool may include a cookie crumb trail 191, which illustrates which navigation steps were navigated automatically (and thus avoided in terms of manual navigation required of the technician). In this example, the year (2010), make (Chevrolet), model (Colorado), engine (5.3 L), system (evaporative emission control or EVAP), and functional test (vent solenoid actuation) were autonomously selected based on an automated vehicle scan tool initialization request. The cookie crumb trail 191 may allow for manual user navigation so that a technician can jump to particular levels to make adjustments. For instance, the technician may navigate to a functional test page in order to change the requested functional test to a related functional test before initiating the functional test on the vehicle.

The display interface 190 additionally includes a menu 192 with a prompt informing a user that automated vehicle scan tool initialization has occurred, and requesting a user confirmation signal in order to initiate the requested functional test. In this case, the prompt is presented as a yes/no question, but other types of user interfaces are also possible. Additionally, for some types of vehicle scan tool functions, a prompt may not be required at all, or it may be displayed on the requesting computing device in addition to or instead of the vehicle scan tool.

As previously noted, a vehicle scan tool may be configured to not always act immediately on automated scan tool initialization requests. In such examples, the vehicle scan tool may be configured to store and display a queue of one or multiple cached vehicle scan tool initialization requests. Each of the requests may be user selectable in order to initialize the vehicle scan tool to perform a corresponding vehicle scan tool function. Each request may correspond to a particular vehicle. Displayed messaging may be customized for each request to indicate whether the vehicle scan tool is currently connected to the appropriate vehicle for a given vehicle scan tool function.

In further examples, a server may provide instructions to modify the current queue of automated initialization requests stored by and/or displayed by a vehicle scan tool. For instance, the server may send a message to the vehicle scan tool to delete a queued item when the server recognizes that a different vehicle scan tool or other piece of shop equipment already performed the previously requested function on the vehicle. In additional examples, a technician may be prompted with an option to accept or reject one or more queued functions once the vehicle scan tool has been connected to a particular vehicle. In such examples, when the technician rejects a particular function, the function may be deleted from the queue that is stored and displayed by the vehicle scan tool.

Figure 27:
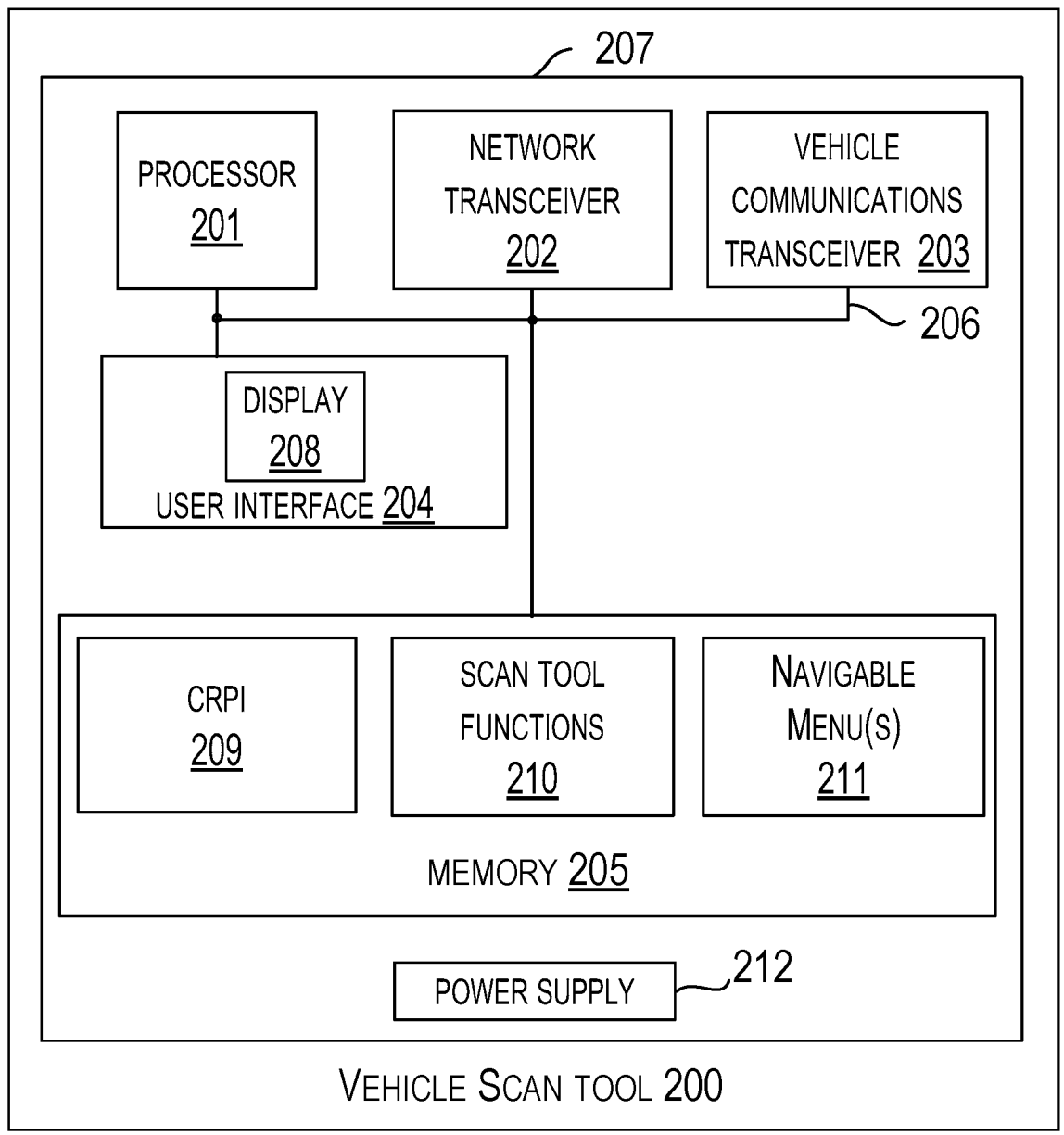
FIG. 27 is a block diagram of an example vehicle scan tool.

Next, FIG. 27 is a block diagram of a vehicle scan tool 200, in accordance with example implementations. Each instance of the vehicle scan tool 4 shown in FIG. 1 can include and/or be configured like the vehicle scan tool 200 or any portion(s) of the vehicle scan tool 200. Furthermore, the vehicle scan tool 200 can operate in any system shown in FIG. 1 in place of the vehicle scan tool 4, or in some other system. As shown in FIG. 27, the vehicle scan tool 200 includes a processor 201, a network transceiver 202, a vehicle communication transceiver (VCT) 203, a user interface 204, and a memory 205. Two or more of those components can be operatively coupled together via a system bus, network, or other connection mechanism 206. The vehicle scan tool 200 also includes a power supply 212 and a housing 207. The user interface 204 includes a display 208. The display 208 can be connected to the connection mechanism 206.

A processor, such as the processor 201 and/or any other processor discussed in this description, can include one or more processors. A processor discussed in this description can thus also be referred to as least one processor or one or more processors. A processor can include a general purpose processor (e.g., an INTEL® single core microprocessor or an INTEL® multicore microprocessor), or a special purpose processor (e.g., a digital signal processor, a graphics processor, an embedded processor, or an application specific integrated circuit (ASIC) processor).

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the processor 201 can, but need not necessarily, include (a) an advanced RISC (reduced instruction set computer) machine (ARM) processor (e.g., an AT91SAM4E ARM processor provided by the Atmel® Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

A processor can be configured to execute computer-readable program instructions (CRPI). The CRPI discussed in this disclosure, such as the CRPI 209, can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. A processor can be configured to execute hard-coded functionality in addition to or as an alternative to software-coded functionality (e.g., via CRPI). The processor 201 can be programmed to perform any function or combination of functions described herein as being performed by the vehicle scan tool 200.

A memory, such as the memory 205 and/or any other memory discussed in this description, can include one or more memories. Any memory discussed in this description can thus also be referred to as least one memory or one or more memories. A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor. Furthermore, some portion of the memory 205 can be used as a data buffer (which can more simply be referred to as a "buffer"). As an example, data the network transceiver 202 receives from a server can be stored in the buffer. At least a portion of the buffer can operate as a cache from which the processor 201 reads stored data multiple times.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), a hard drive, or a compact disk read-only memory (CD-ROM). The RAM can include static RAM or dynamic RAM.

A transceiver, such as the network transceiver 202, the VCT 203, and/or any other transceiver discussed in this description, can include one or more transceivers. Each transceiver includes one or more transmitters configured to transmit data or a communication onto a network, data bus, and/or communication link. Each transceiver includes one or more receivers configured to receive data or a communication carried over a network, data bus, and/or communication link. A transceiver, or a portion thereof, can be located within or as part of a processor (e.g., within a single integrated circuit chip). A transceiver, or a portion thereof, can be separate and distinct from a processor.

The network transceiver 202 can transmit any data or communication discussed as being transmitted, output, or provided by the vehicle scan tool 200, such as a datum or a communication transmitted, output or provided to a vehicle, a communication network, and/or a server. The network transceiver 202 can receive any data or communications discussed as being received by the vehicle scan tool 200 and/or the network transceiver 202, such as a datum or communication the vehicle scan tool 200 and/or the network transceiver 202 receives from a vehicle, a communication network, and/or a server.

The VCT 203 includes a transceiver configured for transmitting a VDM to a vehicle and for receiving a VDM transmitted by a vehicle. The VCT 203 can include a transceiver (e.g., an integrated transmitter and receiver, or a distinct transmitter and a distinct receiver). In some implementations, a transmitter of the VCT 203 can transmit a VDM to a vehicle. The VDM transmitted to the vehicle can include a request for diagnostic information (such as a DTC) from an ECU in the vehicle. In those implementations, the receiver of the VCT 203 can receive a VDM transmitted by the vehicle. The VDM received by the receiver of the VCT 203 can include diagnostic information transmitted by an ECU in the vehicle. A VDM can include a component identifier, such as an identifier of the ECU that transmits the VDM. The VDM can include data indicative of a DTC set by the ECU. The processor 201 can select data from within the VDM and cause the selected data to be displayed on the display 208.

The VCT 203 can include a transceiver (e.g., an integrated transmitter and receiver, or a distinct transmitter and a distinct receiver). The transmitter of the VCT 203 can be configured to transmit a VDM to a vehicle or, in particular, an ECU within the vehicle. The VDM transmitted by the VCT 203 can include a VDM with a request for a DTC set by the ECU. The receiver of the VCT 203 can be configured to receive a VDM transmitted by an ECU over a vehicle-to-tool link. In some implementations, the VDM received by the VCT 203 can include a VDM indicative of a DTC set within the vehicle. As an example, a wired transceiver of the VCT 203 can include a transceiver such as a system basis chip with high speed CAN transceiver 33989 provided by NXP Semiconductors, Eindhoven, Netherlands.

The VDM transmitted and/or received by the VCT 203 can be arranged according to a standard for a geographic region in which the identified vehicle operates. For example, in the United States, the VDM can be arranged according to the OBD II standard. As another example, in European countries, the VDM can be arranged according the an EOBD standard in line with European Directive 98/69/EC.

In some implementations, a vehicle-to-tool link includes a wiring harness. The wiring harness can be configured to provide a wired connection between the vehicle scan tool 200 and a vehicle. In some implementations, the wiring harness can be removably connected to a DLC within the vehicle. The VCT 203 can include and/or connect to one or more connectors, one of which can be located at an end of the wiring harness. In some other implementations, a vehicle-to-tool link includes a wireless link between transceivers in the vehicle scan tool 200 and the vehicle. As an example, the transceiver in the vehicle can be within a vehicle component. As another example, the transceiver in the vehicle can within a vehicle-to-tool link device.

The VCT 203 can include a wireless transceiver to communicate with a separate wireless transceiver within the vehicle scan tool 200. A transmitter, such as a transmitter in the network transceiver 202 or in the VCT 203, or a transmitter in any other transceiver discussed in this description, can include a radio transmitter configured to transmit radio signals carrying data or a communication, and a receiver, such as a receiver in the network transceiver 202 or in the VCT 203, or a receiver in any other transceiver discussed in this description, can include a radio receiver configured to receive radio signals carrying data or a communication. A transceiver with a radio transmitter and radio receiver can include one or more antennas and can be referred to as a "radio transceiver," an "RF transceiver," or a "wireless transceiver."

A radio signal transmitted or received by a radio transceiver can be arranged in accordance with one or more wireless communication standards or protocols such as an Institute of Electrical and Electronics Engineers (IEEE) standard, such as (i) an IEEE 802.11 standard for wireless local area networks (wireless LAN) (which is sometimes referred to as a Wi-Fi standard) (e.g., 802.11a, 802.11b, 802.11g, or 802.11n), (ii) an IEEE 802.15 standard (e.g., 802.15.1, 802.15,3, 802.15.4 (ZigBee®), or 802.15.5) for wireless personal area networks (PANs), (iii) a Bluetooth® version 4.1 or 4.2 standard developed by the Bluetooth® Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are available.

Additionally or alternatively, a transmitter, such as a transmitter in the network transceiver 202 or in the VCT 203, can transmit a signal (e.g., one or more signals or one or more electrical waves) carrying or representing data or a communication onto a wire (e.g., one or more wires) and a receiver, such as a receiver in the network transceiver 202 or in the VCT 203, can receive via a wire a signal carrying or representing data or a communication over the wire. The wire can be part of a network. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data or communication transmitted by a network transceiver, such as the network transceiver 202, can include a destination identifier or address of a network device to which the data or communication is to be transmitted. The data or communication transmitted by a network transceiver can include a source identifier or address of the system component including the network transceiver. The source identifier or address can be used to send a response to the network device that includes the network transceiver that sent the data or communication.

A network transceiver, such as the network transceiver 202, configured to carry out communications over a communication network can include at least one of the following: a modem, a network interface card, or a chip mountable on a circuit board. As an example the chip can include a CC3100 Wi-Fi® network processor available from Texas Instruments®, Dallas, Tex., a CC256MODx Bluetooth® Host Controller Interface (HCI) module available from Texas Instruments®, or a different chip for communicating via Wi-FiR, Bluetooth® or another communication protocol.

A device within or coupled to a communication network or that communicates via the communication network using a packet-switched technology can be locally configured for a next 'hop' in the network (e.g., a device or address where to send data to, and where to expect data from). As an example, a device (e.g., a transceiver) configured for communicating using an IEEE 802.11 standard can be configured with a network name, a network security type, and a password. Some devices auto-negotiate this information through a discovery mechanism (e.g., a cellular phone technology).

The user interface 204 includes at least one component operable to input data (e.g., a user selection) to the processor 201 and at least one component operable to output data (e.g., data output by the processor 201). The component(s) of the user interface 204 can be referred to as a "user interface component." In some implementations, the display 208 can include a touch screen display that is operable to input data to the processor 201 and to display data output by the processor 201. In some implementations, the user interface component(s) includes a keypad and/or a capture device.

A user interface component can include a control. A control can be used by a user of the vehicle scan tool 200 to enter an input into the vehicle scan tool 200, such as an input detectable by the processor 201. A control can include a user-selectable control of a U/I screen shown on the display 208. A control can include a hardware control, such as a key of the keypad. In one respect, a user-selectable control can be independent of the keys of the keypad. In that case, an input can be entered using the user-selectable control by use of the display 208, for example by touching the display 208 in proximity to the user-selectable control. In another respect, a user-selectable control shown on the display 208 can be associated with a key of the keypad. In that case, an input can be entered using the user-selectable control by use of the key of the keypad. The keypad can include a key that is not associated with a user-selectable control shown on the display 208.

The display 208 can, but need not necessarily, include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can be backlit, color LCD. The display 208 can include a touch screen display with the LCD. For instance, the display 208 can include a capacitive (such as a projective capacitive) touch screen display or a resistive touch screen display. Other examples of the display 208 are available.

The display 208 can include a horizontal scroll bar and a vertical scroll bar. The horizontal scroll bar and the vertical scroll bar can be used to cause the display 208 to display a non-visible portion of an image or a display screen output by the processor 201. The display 208 can display still images and/or a video.

The display 208 can show a GUI that includes graphical objects. For instance, the GUI can show user-selectable controls via which a user can enter an input pertaining to use of the vehicle scan tool 200. The input can represent a selection and/or information. As an example, a user-selectable control can include a graphical button, such as a rectangle surrounding text representative of a selection or information associated with the button. As another example, a user-selectable control can include a pull-down menu, a check box, and/or a text box for entering textual information. A user-selectable control configured for entering a selection can be referred to as a selector. The processor 201 can output a U/I screen to the display 208. The U/I screen output by the processor 201 can be referred to as a "graphical user interface" or "GUI."

A keypad can include one or more components configured for use by a user to enter selections or information into the vehicle scan tool 200. A key configured for entering a selection can be referred to as a control key. The keypad can include one or more control keys, or more simply "key". A key can include a push button, such as a press-and-hold button or a press-and-release button. In some implementations, the keypad includes a hardware keyboard with a set of numeric keys, alpha-numeric keys, alphabet keys, or some other hardware keys. In some other implementations, the display 208 includes at least a portion of the keypad that includes soft keys, such as capacitive or resistive keys of a touch screen display. In still other implementations, the keypad includes at least one hardware key, such as a power on/off key, a yes key and a no key, or four cursor keys for selecting a direction such as up, down, left or right. In still yet other implementations, the soft keys of the keypad on the touch screen display can include a power on/off key, a yes key and a no key, or four cursor keys.

A capture device can include one or more components configured to generate data based on objects in proximity to the vehicle scan tool 200 and/or signals from which that data can be generated. As an example, the data generated by the captured device can include an image (e.g., an image file), content of a scanned image, and/or measurement data. In at least some implementations, the capture device includes at least one of the following: an image scanner, a barcode scanner, a visual light camera, a light source, a lens, or an image sensor. A data file representative of a captured image or content of a scanned image can be stored in the memory 205. As an example, the captured image can include at least one of the following: an image of the vehicle, or an image of some portion of the vehicle, such as a license plate attached to the vehicle or a VIN label attached to the vehicle. As another example, the captured image can include image data of a scanned barcode, such as the barcode on a VIN label attached to the vehicle.

The connection mechanism 206 can include any of a variety of conductions to carry communications or data between the components connected to the connection mechanism 206. As an example, the connection mechanism 206 can include a copper foil trace of a printed circuit board, a wire, or some other conductor.

The power supply 212 can be configured in any of a variety of configurations or combinations of the variety of configurations. As an example, the power supply 212 can include circuitry to receive AC current from an AC electrical supply (e.g., electrical circuits connected to an electrical wall outlet) and convert the AC current to a DC current for supplying to one or more of the components within the vehicle scan tool 200. As another example, the power supply 212 can include a battery or be battery operated. As yet another example, the power supply 212 can include a solar cell or be solar operated. The power supply 212 can include electrical circuits to distribute electrical current throughout the vehicle scan tool 200. Other examples of the power supply 212 are available.

The housing 207 can surround at least a portion of the processor 201, at least a portion of the network transceiver 202, at least a portion of the VCT 203, at least a portion of the user interface 204, at least a portion of the memory 205, at least a portion of the connection mechanism 206, at least a portion of the display 208, and/or at least a portion of the power supply 212. The housing 207 can be referred to as an enclosure. The housing 207 can support a substrate. At least a portion of the processor 201, at least a portion of the network transceiver 202, at least a portion of the VCT 203, at least a portion of the user interface 204, at least a portion of the memory 205, at least a portion of the connection mechanism 206, and/or a least a portion of the display 208 can be mounted on and/or connect to the substrate. The housing 207 can be made from various materials. For example, the housing 207 can be made from a plastic material (e.g., acrylonitrile butadiene styrene (ABS)) and a thermoplastic elastomer used to form a grip on the housing 207.

The memory 205 stores computer-readable data. In an example implementation, the computer-readable data stored in the memory 205 can include data from among: the CRPI 209, scan tool functions 210, and navigable menu(s) 211.

The scan tool functions 210 include computer-readable data the processor 201 uses to perform a scan tool function that includes transmitting at least one VDM. In an example implementation, the data to perform a scan tool function includes VDM data (i.e., the data to be transmitted as the VDM). For instance, the VDM data according to the ISO 11898 VDM protocol can include a start-of-frame bit, a multi-bit control field, a zero to eight byte data field, a multi-bit cyclic redundancy check field, an acknowledgement slot bit, an acknowledgment delimiter bit, and a multi-bit end-of-frame field. Examples of VDM data for other VDM protocols are possible. In another example implementation, the data to perform a scan tool function includes VDM data and data from among: a scan tool function identifier, a VCT identifier indicating which VCT of two or more VCT is to be used to transmit the VDM, vehicle identification indicating which vehicle(s) are associated with the scan tool function, and a scan tool function category. Each VDM transmitted by the processor 201 to perform a scan tool function is directed to at least one component in a vehicle. In some implementations, the component includes an ECU or a sensor connected to an ECU. The VDM can include data that the component responsively uses to perform some function in the vehicle.

The scan tool functions 210 can also include CRPI to cause the display 208 to display data pertaining to the scan tool function. As an example, a scan tool function can include data for determining a VDM transmitted by the vehicle is a response to a VDM transmitted by the vehicle scan tool 200 to perform the scan tool function. In some implementations, a scan tool function is associated with a memory address for use as a pointer to the scan tool function.

A scan tool function identifier can include data indicative of a scan tool function within the scan tool functions 210. As an example, a scan tool function identifier can include a descriptive textual name (e.g., park brake cable service release) for displaying on a display. For instance, the processor 201 can populate a user-selectable control of a U/I screen with the descriptive textual name of the scan tool function. As another example, a scan tool function identifier can include a non-descriptive identifier of the scan tool function (e.g., a memory address) for accessing the scan tool function from the memory 205. The descriptive textual name of a scan tool function can be associated with the non-descriptive identifier of the scan tool function. A search of the memory 205 based on a descriptive textual name can be used to determine the memory address for accessing the scan tool function from the memory 205.

A system and/or component identifier can include data indicative of a vehicle system and/or a vehicle component. As an example, a system and/or component identifier can include a descriptive textual name (e.g., parking brake control system or parking brake control module) for displaying on a display. For instance, the processor 201 can populate a U/I screen with the descriptive textual name of the vehicle system and/or a vehicle component.

The navigable menu(s) 211 may allow for user configuration of diagnostic information when displayed by vehicle scan tool 200. In this context, "at least one" navigable menu refers to one or more navigable menus. Each piece of information, when manually entered using navigable menu(s) 211, may require a technician to separately select an input value from a list or a different type of input mechanism. The navigable menu(s) 211 may allow for user configuration of scan tool functions 210. In some examples, this configuration may first require a selection of a relevant vehicle system and/or component. Additionally, a separate selection may be required to identify the type of test (e.g., functional test, component test, reset procedure) before being provided with a test list from which an individual test may be selected.

The navigable menu(s) 211 may also allow a user to input at least a portion of a vehicle identifier. As an example, navigable menu(s) 211 for inputting a year, make, model, and engine can be displayed in (1) an order of year, make, model and engine, (2) an order of make, year, model, and engine, or (3) via another order. An additional navigable menu to input another characteristic of the vehicle can be displayed after the navigable menus to input the year, make, model, and engine are displayed. As an example, the additional navigable menu can allow a user to input a characteristic to further distinguish a vehicle being identified such as a characteristic indicating whether or not an air pump is present on the vehicle being identified. Other examples of the additional navigable menu are possible.

The vehicle scan tool 200 may be configured to communicate with a vehicle using a vehicle communication link. As an example, the vehicle communication link in a vehicle can include one or more conductors for carrying vehicle data messages in accordance with a VDM protocol. A VDM protocol can include a Society of Automotive Engineers (SAE)® J1850 (PWM or VPW) VDM protocol, an SAE® J1939 VDM protocol based on the SAE J1939_201808 serial control and communications heavy duty vehicle network—top level document, and/or any other core J1939 standard, an International Organization of Standardization (ISO)® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, an ISO® 11898-1:2015 road vehicle—CAN—Part I: data link layer and physical signaling protocol, a MOST® Cooperation VDM protocol (such as the MOST Specification Rev. 3.0 E2, or the MOST® Dynamic Specification, Rev. 3.0.2), or some other VDM protocol defined for performing communications with or within the vehicle. Each and every VDM discussed in this description is arranged according to a VDM protocol.

Figure 28:
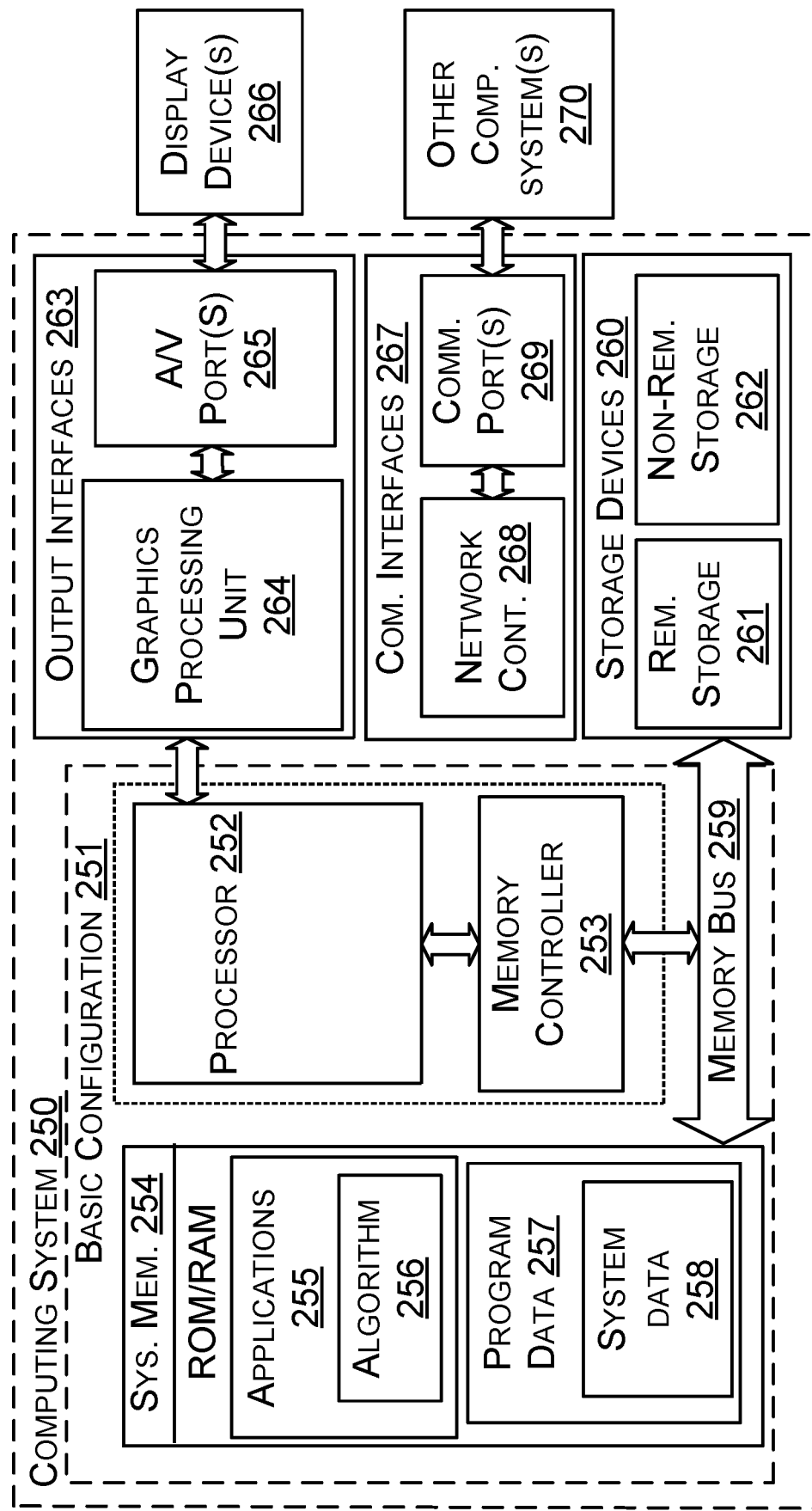
FIG. 28 is a functional block diagram illustrating a computing system that is arranged in accordance with at least some example embodiments.

The server 2, the vehicle scan tool 4, and the primary device 10 (e.g., a search device) each comprise a computing system. The server 2, the vehicle scan tool 4, and/or the primary device 10 can comprise any of the components of an example computing system 250 shown in FIG. 28, which is a functional block diagram illustrating an example computing system.

In a basic configuration 251, the computing system 250 can include one or more processors 252 and a system memory 254. A memory bus 259 can be used for communicating between the processor 252 and the system memory 254. Depending on the desired configuration, the processor 252 can be of any type including but not limited to a microprocessor (µP), a microcontroller (µC), a digital signal processor (DSP), or any combination thereof. A memory controller 253 can also be used with the processor 252, or in some implementations, the memory controller 253 can be an internal part of the processor 252.

Depending on the desired configuration, the system memory 254 can be of any type including but not limited to volatile memory (such as RAM), non-volatile memory (such as ROM, flash memory, etc.) or any combination thereof. The system memory 254 can include one or more applications 255, and program data 257. The application 255 can include an algorithm 256 that is arranged to perform the functions described as being performed by the server 2, the vehicle scan tool 4, or the primary device 10. The program data 257 can include system data 258 that could be directed to any number of types of data, such as one more of the following types of data: the index 61, the mapping data 62, the RO data 63, the diagnostic session data 64, the component hierarchy 65, original OEM content 66, supplemented OEM content 67, technician profile 68, and/or shop profile 69. In some example embodiments, the applications 255 can be arranged to operate with the program data 257 on an operating system executable by the processor 252.

The computing system 250 can have additional features or functionality, and additional interfaces to facilitate communications between the basic configuration 251 and any devices and interfaces. For example, storage devices 260 can be provided including removable storage devices 261, non-removable storage devices 262, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable program instructions, data structures, program modules, or other data such as the data stored in a computer-readable memory, such as the memory 52.

The system memory 254 and the storage devices 260 are examples of computer-readable medium, such as the memory 52. The system memory 254 and the storage devices 260 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 250.

For the vehicle scan tool 4 and the primary device 10 (e.g., a search device), the computing system 250 can include or be implemented as a portion of a small-form factor portable (i.e., mobile) electronic device such as a smartphone (e.g., an IPHONE® smartphone from Apple® Inc. of Cupertino, California, or a GALAXY S® smartphone from Samsung® Electronics Co., Ltd. Of Maetan-Dong, Yeongtong-Gu Suwon-Si, Gyeonggi-Do, Republic of Korea), a tablet device (e.g., an IPAD® tablet device from Apple® Inc., or a SAMSUNG® GALAXY TAB tablet device from Samsung® Electronics Co., Ltd.), or a wearable computing device (e.g., a wireless web-watch device or a personal headset device). The application 255, or the program data 257 can include an application downloaded to the communication interfaces 267 from the APP STORE® online retail store, from the GOOGLE PLAY® online retail store, or another source of the applications or the CRPI described herein for use on the vehicle scan tool 4 and the primary device 10.

Figure 29:
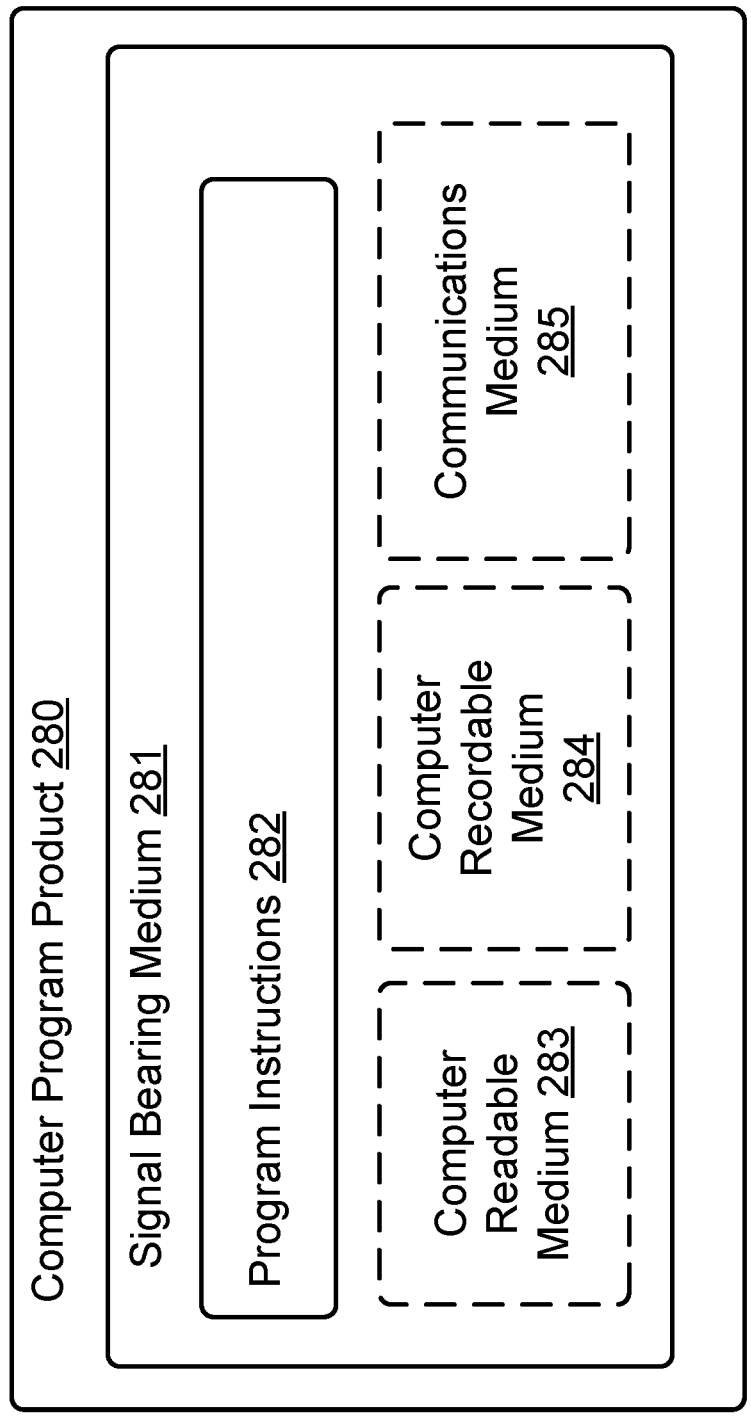
FIG. 29 is a schematic illustrating a conceptual partial view of a computer program product for executing a computer process on a computing system, according to an example embodiment.

Additionally or alternatively, the computing system 250 can include or be implemented as part of a personal computing system (including both laptop computer and non-laptop computer configurations), or a server. In some embodiments, the disclosed methods can be implemented as CRPI encoded on a non-transitory computer-readable storage media in a machine-readable format, or on other non-transitory media or articles of manufacture. FIG. 29 is a schematic illustrating a conceptual partial view of an example computer program product 280 that includes a computer program for executing a computer process on a computing system, arranged according to at least some embodiments presented herein.

The computing system 250 can also include output interfaces 263 that can include a graphics processing unit 264, which can be configured to communicate to various external devices such as display devices 266 or speakers via one or more A/V ports 265 or a communication interface 267. The communication interface 267 can include a network controller 268, which can be arranged to facilitate communications with one or more other computing systems 270 over a network communication via one or more communication ports 269. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 280 is provided using a signal bearing medium 281. The signal bearing medium 281 can include one or more programming instructions 282 that, when executed by one or more processors can provide functionality or portions of the functionality described above with respect to FIG. 1 to FIG. 28.

In some examples, the signal bearing medium 281 can encompass a computer-readable medium 283, such as, but not limited to, a hard disk drive, a Compact Disc (CD), a Digital Versatile Disk (DVD), a digital tape, or any other memory described herein. In some implementations, the signal bearing medium 281 can encompass a computer recordable medium 284, such as, but not limited to, memory, read/write (R/W) CDs, R/W DVDs, etc. In some implementations, the signal bearing medium 281 can encompass a communications medium 285, such as, but not limited to, a digital and/or an analog communication medium (e.g., a fiber optic cable, a waveguide, a wired communications link, a wireless communication link, etc.). Thus, for example, the signal bearing medium 281 can be conveyed by a wireless form of the communications medium 285 (e.g., a wireless communications medium conforming to the IEEE 802.11 standard or another transmission protocol).

The one or more programming instructions 282 can be, for example, computer executable and/or logic implemented instructions. In some examples, a computing system such as the computing system 250 of FIG. 28 can be configured to provide various operations, functions, or actions in response to the programming instructions 282 conveyed to the computing system 250 by one or more of the computer-readable medium 283, the computer recordable medium 284, and/or the communications medium 285.

The processor 50 can be configured like the processor 252. The memory 52 can be configured as part of or all of the system memory 254 or the storage devices 260. The communication interface 51 can be configured as part of or all of the communication interfaces 267.

Each of the server 2, the vehicle scan tool 4, the primary device 10, and the computing system 250 can comprise a power source. In accordance with the example embodiments, a power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source described herein can include various circuit protectors and signal conditioners. The power sources described herein can provide a way to transfer electrical currents to other elements that operate electrically.

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising A, B, and/or C, or at least one of A, B, and C, or one or more of A, B, and C is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

Embodiments of the present disclosure may thus relate to one of the enumerated example embodiment (EEEs) listed below.

EEE 1 is a method comprising: (i) receiving, by a computing device, textual vehicle service content; (ii) identifying, by the computing device, a vehicle scan tool function relevant to associated text at a location within the textual vehicle service content; (iii) modifying, by the computing device, the textual vehicle service content to include a selectable link at the location of the associated text, wherein the selectable link is selectable to initialize a vehicle scan tool to perform the identified vehicle scan tool function on a vehicle; and (iv) providing, by the computing device, the modified textual vehicle service content including the selectable link.

EEE 2 is the method of EEE 1, wherein identifying the vehicle scan tool function comprises determining that the associated text describes the vehicle scan tool function.

EEE 3 is the method of EEE 1 or EEE 2, wherein identifying the vehicle scan tool function comprises: (i) determining that the associated text describes a vehicle component; and (ii) identifying the vehicle scan tool function based on the vehicle component and a component-to-function mapping.

EEE 4 is the method of any one of EEE 1 to 3, wherein identifying the vehicle scan tool function comprises: (i) determining that the associated text describes a vehicle symptom; and (ii) identifying the vehicle scan tool function based on the vehicle symptom, a symptom-to-component mapping, and a component-to-function mapping.

EEE 5 is the method of EEE 4, wherein the vehicle symptom comprises a diagnostic trouble code (DTC).

EEE 6 is the method of any one of EEE 1 to 5, wherein identifying the vehicle scan tool function comprises: (i) determining that the associated text describes a vehicle system; (ii) identifying a vehicle component that is part of the vehicle system; and (iii) identifying the vehicle scan tool function based on the vehicle component and a component-to-function mapping.

EEE 7 is the method of any one of EEE 1 to 6, wherein identifying the vehicle scan tool function comprises: (i) determining that the associated text describes a vehicle component; (ii) determining that the vehicle component is part of a vehicle system; and (iii) identifying the vehicle scan tool function based on the vehicle system and a system-to-function mapping.

EEE 8 is the method of any one of EEE 1 to 7, wherein identifying the vehicle scan tool function comprises: (i) determining a temporal vehicle service phase described by the textual vehicle service content; and (ii) identifying the vehicle scan tool function based on the temporal vehicle service phase.

EEE 9 is the method of EEE 8, wherein the determined temporal vehicle service phase comprises an after-repair phase, and wherein the vehicle scan tool function comprises a reset procedure.

EEE 10 is the method of any one of EEE 1 to 9, wherein the identified vehicle scan tool function comprises performing a functional test on the vehicle with the vehicle scan tool.

EEE 11 is the method of any one of EEE 1 to 10, wherein the identified vehicle scan tool function comprises a retrieving list of relevant parameter identifier values (PIDs) for display on the vehicle scan tool.

EEE 12 is the method of any one of EEE 1 to 11, wherein modifying the textual vehicle service content comprises converting the associated text into the selectable link within the textual vehicle service content.

EEE 13 is the method of any one of EEE 1 to 12, wherein modifying the textual vehicle service content comprises including the selectable link in a dropdown menu proximate to the associated text within the textual vehicle service content.

EEE 14 is the method of any one of EEE 1 to 13, further comprising: (i) identifying, within the textual vehicle service content, at least one configuration parameter for performance of the vehicle scan tool function; and (ii) modifying the textual vehicle service content to include the at least one configuration parameter with the selectable link.

EEE 15 is the method of any one of EEE 1 to 14, wherein the textual vehicle service content comprises a wiring diagram, and wherein modifying the textual service content to include the selectable link comprises modifying the wiring diagram to include a plurality of selectable links corresponding to a plurality of vehicle components in the wiring diagram, wherein each selectable link is selectable to initialize the vehicle scan tool to perform a respective vehicle scan tool function related to a corresponding vehicle component in the wiring diagram.

EEE 16 is a system comprising a vehicle scan tool and a computing device configured to: (i) receive textual vehicle service content; (ii) identify a vehicle scan tool function relevant to associated text at a location within the textual vehicle service content; (iii) modify the textual vehicle service content to include a selectable link at the location of the associated text, wherein the selectable link is selectable to initialize the vehicle scan tool to perform the identified vehicle scan tool function on a vehicle; and (iv) provide the modified textual vehicle service content including the selectable link.

EEE 17 is the system of EEE 16, further comprising a display device, wherein the display device is configured to: (i) receive, from the computing device, the modified textual vehicle service content including the selectable link; and (ii) display the modified textual vehicle service content including the selectable link.

EEE 18 is the system of EEE 17, wherein the display device is further configured to: (i) receive a user selection of the selectable link; (ii) in response to receiving the user selection of the selectable link, provide instructions to the vehicle scan tool to initialize the vehicle scan tool to perform the identified vehicle scan tool function on the vehicle.

EEE 19 is the system of any one of EEE 16 to 18, wherein the vehicle scan tool is configured to: (i) receive a user confirmation to perform the identified vehicle scan tool function on the vehicle; and (ii) in response to receiving the user confirmation, transmit one or more communication signals to the vehicle in order to perform the identified vehicle scan tool function on the vehicle.

EEE 20 is a non-transitory computer readable medium having stored therein instructions executable by one or more processors to cause a computing system to perform functions comprising: (i) receiving textual vehicle service content; (ii) identifying a vehicle scan tool function relevant to associated text at a location within the textual vehicle service content; (iii) modifying the textual vehicle service content to include a selectable link at the location of the associated text, wherein the selectable link is selectable to initialize a vehicle scan tool to perform the identified vehicle scan tool function on a vehicle; and (iv) providing the modified textual vehicle service content including the selectable link.

EEE 21 is a computing device that is configured to perform the method of any one of EEE 1 to 15.

EEE 22 is a non-transitory computer readable medium having stored therein instructions executable by one or more processors to cause a computing system to perform the method of any one of EEE 1 to 15.

EEE 23 is a system that includes means for performing the method of any one of EEE 1 to 15.

We claim:

1. A method, comprising:
    receiving, by a computing device comprising one or more processors and a non-transitory computer readable medium having stored therein instructions executable by the one or more processors, vehicle service content;
    identifying, by the computing device, a vehicle scan tool function relevant to associated content at a location within the vehicle service content, wherein identifying the vehicle scan tool function comprises:
        determining a temporal vehicle service phase described by the vehicle service content; and
        identifying the vehicle scan tool function based on the temporal vehicle service phase;
    modifying, by the computing device, the vehicle service content to include a selectable option at the location of the associated content, wherein the selectable option is selectable to initialize a vehicle scan tool to perform the identified vehicle scan tool function on a vehicle; and
    providing, by the computing device for display on the vehicle scan tool, the modified vehicle service content including the selectable option.

2. The method of claim 1, wherein the determined temporal vehicle service phase comprises a before-repair phase, a repair phase, or an after-repair phase.

3. The method of claim 1, wherein the determined temporal vehicle service phase comprises an after-repair phase, and wherein the vehicle scan tool function comprises a reset procedure.

4. The method of claim 1, wherein modifying the vehicle service content to include the selectable option comprises:
    modifying the vehicle service content to include a plurality of selectable options corresponding to a plurality of vehicle components in the vehicle service content, wherein each selectable option is selectable to initialize the vehicle scan tool to perform a respective vehicle scan tool function related to a corresponding vehicle component in the vehicle service content.

5. The method of claim 4, wherein the vehicle service content comprises a wiring diagram illustrating the plurality of vehicle components.

6. The method of claim 1, wherein the selectable option comprises a selectable link, and wherein modifying the vehicle service content comprises converting the associated content into the selectable link within the vehicle service content.

7. The method of claim 1, wherein modifying the vehicle service content comprises including the selectable option in a dropdown menu proximate to the associated content within the vehicle service content.

8. The method of claim 1, wherein the identified vehicle scan tool function comprises performing a functional test on the vehicle with the vehicle scan tool.

9. The method of claim 1, wherein the identified vehicle scan tool function comprises retrieving a list of relevant parameter identifier values (PIDs) for display on the vehicle scan tool.

10. The method of claim 1, wherein identifying the vehicle scan tool function comprises determining that the associated content describes the vehicle scan tool function.

11. The method of claim 1, wherein identifying the vehicle scan tool function comprises:
    determining that the associated content describes a vehicle component; and
    identifying the vehicle scan tool function based on the vehicle component and a component-to-function mapping.

12. The method of claim 1, wherein identifying the vehicle scan tool function comprises:
    determining that the associated content describes a vehicle symptom; and
    identifying the vehicle scan tool function based on the vehicle symptom, a symptom-to-component mapping, and a component-to-function mapping.

13. The method of claim 12, wherein the vehicle symptom comprises a diagnostic trouble code (DTC).

14. The method of claim 1, wherein identifying the vehicle scan tool function comprises:
    determining that the associated content describes a vehicle system;
    identifying a vehicle component that is part of the vehicle system; and
    identifying the vehicle scan tool function based on the vehicle component and a component-to-function mapping.

15. The method of claim 1, wherein identifying the vehicle scan tool function comprises:
    determining that the associated content describes a vehicle component;
    determining that the vehicle component is part of a vehicle system; and
    identifying the vehicle scan tool function based on the vehicle system and a system-to-function mapping.

16. The method of claim 1, further comprising:
    identifying, within the vehicle service content, at least one configuration parameter for performance of the vehicle scan tool function; and
    modifying the vehicle service content to include the at least one configuration parameter in association with the selectable option.

17. The method of claim 1, wherein the vehicle service content comprises textual vehicle service content, and wherein the associated content comprises associated text.

18. A computing device comprising one or more processors and a non-transitory computer readable medium having stored therein instructions executable by the one or more processors to perform functions comprising:
    receiving, by the computing device, vehicle service content;

identifying, by the computing device, a vehicle scan tool function relevant to associated content at a location within the vehicle service content, wherein identifying the vehicle scan tool function comprises:
- determining a temporal vehicle service phase described by the vehicle service content; and
- identifying the vehicle scan tool function based on the temporal vehicle service phase;

modifying, by the computing device, the vehicle service content to include a selectable option at the location of the associated content, wherein the selectable option is selectable to initialize a vehicle scan tool to perform the identified vehicle scan tool function on a vehicle; and providing, by the computing device for display on the vehicle scan tool, the modified vehicle service content including the selectable option.

19. A non-transitory computer readable medium having stored therein instructions executable by one or more processors to cause a computing device comprising the non-transitory computer readable medium and the one or more processors to perform functions comprising:

receiving, by the computing device, vehicle service content;

identifying, by the computing device, a vehicle scan tool function relevant to associated content at a location within the vehicle service content, wherein identifying the vehicle scan tool function comprises:
- determining a temporal vehicle service phase described by the vehicle service content; and
- identifying the vehicle scan tool function based on the temporal vehicle service phase;

modifying, by the computing device, the vehicle service content to include a selectable option at the location of the associated content, wherein the selectable option is selectable to initialize a vehicle scan tool to perform the identified vehicle scan tool function on a vehicle; and providing, by the computing device for display on the vehicle scan tool, the modified vehicle service content including the selectable option.

* * * * *